US007526966B2

(12) United States Patent
Gysling et al.

(10) Patent No.: US 7,526,966 B2
(45) Date of Patent: *May 5, 2009

(54) APPARATUS AND METHOD FOR MEASURING A PARAMETER OF A MULTIPHASE FLOW

(75) Inventors: Daniel L. Gysling, Glastonbury, CT (US); Alex van der Spek, Rottendam (NL)

(73) Assignee: Expro Meters, Inc., Wallingford, CT (US)

( * ) Notice: Subject to any disclaimer, the term of this patent is extended or adjusted under 35 U.S.C. 154(b) by 54 days.

This patent is subject to a terminal disclaimer.

(21) Appl. No.: 11/652,363

(22) Filed: Jan. 10, 2007

(65) Prior Publication Data

US 2007/0157737 A1 Jul. 12, 2007

Related U.S. Application Data

(63) Continuation-in-part of application No. 11/442,954, filed on May 30, 2006.

(60) Provisional application No. 60/758,242, filed on Jan. 10, 2006, provisional application No. 60/736,684, filed on Nov. 14, 2005, provisional application No. 60/685,532, filed on May 27, 2005.

(51) Int. Cl.
*G01F 1/32* (2006.01)
(52) U.S. Cl. .................................. 73/861.23
(58) Field of Classification Search ............. 73/861.23, 73/61.45, 861.18, 861.25, 861.26, 861.27, 73/861.04, 861.28
See application file for complete search history.

(56) References Cited

U.S. PATENT DOCUMENTS

| 2,874,568 A | 2/1959 | Petermann ................ 73/861.02 |
| 3,715,709 A | 2/1973 | Zacharias et al. ............. 367/95 |
| 3,751,979 A | 8/1973 | Ims .......................... 73/861.27 |
| 3,781,895 A | 12/1973 | Monser ....................... 343/708 |
| 3,851,521 A | 12/1974 | Ottenstein ................... 73/40.5 |
| 3,885,432 A | 5/1975 | Herzl ....................... 73/861.22 |
| 3,952,578 A | 4/1976 | Jacobs ........................ 73/64.1 |

(Continued)

FOREIGN PATENT DOCUMENTS

DE 4306119 9/1994

(Continued)

OTHER PUBLICATIONS

U.S. Appl. No. 11/442,954.*

(Continued)

*Primary Examiner*—Jewel V Thompson

(57) ABSTRACT

An apparatus is provided that determines a characteristic of a multiphase fluid, such as an aerated oil and water fluid, flowing within a pipe. The apparatus includes a fluid flow meter, a water cut meter, and a density meter, wherein the density meter determines the density of the fluid flow to determine the gas volume (or void) fraction of the multiphase fluid flow. The output signal of each of the meters is provided to a multiphase flow model to provide a plurality of multiphase parameters, such as phase fraction, volumetric flow, mass flow of each of the phases of the multiphase mixture, optimized for various flow conditions. Each of the meters may be secured to the outer surface of the pipe using various means, such a clamping means.

12 Claims, 16 Drawing Sheets

U.S. PATENT DOCUMENTS

| | | | |
|---|---|---|---|
| 4,004,461 A | 1/1977 | Lynnworth | 73/861.27 |
| 4,032,259 A | 6/1977 | Brown | 417/43 |
| 4,048,853 A | 9/1977 | Smith et al. | 73/861.25 |
| 4,080,837 A | 3/1978 | Alexander et al. | 73/61.45 |
| 4,195,517 A | 4/1980 | Kalinoski et al. | 73/461.27 |
| 4,248,085 A | 2/1981 | Coulthard | 73/861.06 |
| 4,320,659 A | 3/1982 | Lynnworth et al. | 73/589 |
| 4,445,389 A | 5/1984 | Potzick et al. | 73/861.27 |
| 4,491,008 A | 1/1985 | Marini et al. | |
| 4,520,320 A | 5/1985 | Potzick et al. | 328/133 |
| 4,561,310 A | 12/1985 | Barnard et al. | 73/861.02 |
| 4,677,305 A | 6/1987 | Ellinger | 73/290 V |
| 4,717,159 A | 1/1988 | Alston et al. | 330/149 |
| 4,896,540 A | 1/1990 | Shakkottai et al. | 73/861.02 |
| 4,932,262 A | 6/1990 | Wlodarczyk | 250/227.3 |
| 4,977,915 A * | 12/1990 | Marrelli | 137/4 |
| 5,040,415 A | 8/1991 | Barkhoudarian | 73/861.03 |
| 5,060,506 A | 10/1991 | Douglas | 73/24.01 |
| 5,083,452 A | 1/1992 | Hope | |
| 5,218,197 A | 6/1993 | Carroll | 250/227.19 |
| 5,259,250 A | 11/1993 | Kolpak | |
| 5,285,675 A | 2/1994 | Colgate et al. | 73/23.2 |
| 5,289,726 A | 3/1994 | Miau et al. | 73/861.22 |
| 5,359,897 A | 11/1994 | Hamstead et al. | 73/597 |
| 5,363,342 A | 11/1994 | Layton et al. | 367/149 |
| 5,367,911 A | 11/1994 | Jewell et al. | 73/861.08 |
| 5,398,542 A | 3/1995 | Vasbinder | 73/40.5 |
| 5,415,048 A | 5/1995 | Diatschenko et al. | |
| 5,524,475 A | 6/1996 | Kolpak et al. | 73/19.03 |
| 5,526,844 A | 6/1996 | Kamen et al. | 137/614.11 |
| 5,591,922 A | 1/1997 | Segeral et al. | 73/861.04 |
| 5,625,140 A | 4/1997 | Cadet et al. | 73/24.01 |
| 5,708,211 A | 1/1998 | Jepson et al. | 73/861.04 |
| 5,741,980 A | 4/1998 | Hill et al. | 73/861.04 |
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,856,622 A | 1/1999 | Yamamoto et al. | 73/861.28 |
| 5,948,959 A | 9/1999 | Peloquin | 73/1.83 |
| 6,016,702 A | 1/2000 | Maron | 73/705 |
| 6,151,958 A | 11/2000 | Letton et al. | 73/61.79 |
| 6,202,494 B1 | 3/2001 | Riebel et al. | 73/861.29 |
| 6,233,374 B1 | 5/2001 | Ogle et al. | 385/13 |
| 6,261,232 B1 | 7/2001 | Yokosawa et al. | 600/443 |
| 6,345,539 B1 | 2/2002 | Rawes et al. | 73/861.27 |
| 6,349,599 B1 | 2/2002 | Lynnworth et al. | 73/644 |
| 6,354,147 B1 | 3/2002 | Gysling et al. | 73/61.79 |
| 6,378,357 B1 | 4/2002 | Han et al. | 73/54.41 |
| 6,397,683 B1 | 6/2002 | Hagenmeyer et al. | 73/861.18 |
| 6,412,353 B1 | 7/2002 | Kleven et al. | 73/861.22 |
| 6,435,030 B1 | 8/2002 | Gysling et al. | 73/587 |
| 6,442,996 B1 | 9/2002 | Thurston et al. | 73/24.01 |
| 6,443,226 B1 | 9/2002 | Diener et al. | 166/241.6 |
| 6,450,037 B1 | 9/2002 | McGuinn et al. | 73/705 |
| 6,463,813 B1 | 10/2002 | Gysling | 73/862.59 |
| 6,532,827 B1 | 3/2003 | Ohnishi | 73/861.27 |
| 6,536,291 B1 | 3/2003 | Gysling et al. | 73/861.42 |
| 6,550,342 B2 | 4/2003 | Croteau et al. | 73/800 |
| 6,558,036 B2 | 5/2003 | Gysling et al. | 374/147 |
| 6,575,043 B1 | 6/2003 | Huang et al. | 73/861.18 |
| 6,587,798 B2 | 7/2003 | Kersey et al. | 702/50 |
| 6,601,005 B1 | 7/2003 | Kavaklioglu et al. | 702/104 |
| 6,601,458 B1 | 8/2003 | Gysling et al. | 73/861.04 |
| 6,609,069 B2 | 8/2003 | Gysling | 702/48 |
| 6,658,945 B1 | 12/2003 | Kleven | 73/861.22 |
| 6,672,163 B2 | 1/2004 | Han et al. | 73/597 |
| 6,691,584 B2 | 2/2004 | Gysling et al. | 73/861.42 |
| 6,698,297 B2 | 3/2004 | Gysling | 73/861.63 |
| 6,732,575 B2 | 5/2004 | Gysling et al. | 73/61.79 |
| 6,773,603 B2 | 8/2004 | Moorehead et al. | 210/704 |
| 6,782,150 B2 | 8/2004 | Davis et al. | 385/12 |
| 6,813,962 B2 | 11/2004 | Gysling et al. | 73/861.26 |
| 6,837,098 B2 | 1/2005 | Gysling et al. | 73/61.79 |
| 6,837,332 B1 | 1/2005 | Rodney | 181/105 |
| 6,862,920 B2 | 3/2005 | Gysling et al. | 73/61.79 |
| 6,889,562 B2 | 5/2005 | Gysling et al. | 73/861.42 |
| 6,898,541 B2 | 5/2005 | Gysling et al. | 902/100 |
| 6,945,095 B2 * | 9/2005 | Johansen | 73/61.45 |
| 6,959,604 B2 | 11/2005 | Bryant et al. | |
| 6,971,259 B2 | 12/2005 | Gysling | |
| 6,988,411 B2 | 1/2006 | Gysling et al. | |
| 7,032,432 B2 | 4/2006 | Gysling et al. | |
| 7,058,549 B2 | 6/2006 | Gysling et al. | |
| 7,062,976 B2 | 6/2006 | Gysling et al. | |
| 7,086,278 B2 | 8/2006 | Gysling et al. | |
| 7,096,719 B2 | 8/2006 | Gysling | |
| 7,110,893 B2 | 9/2006 | Loose et al. | |
| 7,121,152 B2 | 10/2006 | Winston et al. | |
| 7,127,360 B2 | 10/2006 | Gysling et al. | |
| 7,134,320 B2 | 11/2006 | Gysling et al. | |
| 7,139,667 B2 | 11/2006 | Rothman et al. | |
| 2002/0123852 A1 | 9/2002 | Gysling et al. | |
| 2002/0129662 A1 | 9/2002 | Gysling et al. | |
| 2003/0038231 A1 | 2/2003 | Bryant et al. | |
| 2003/0089161 A1 | 5/2003 | Gysling | |
| 2003/0136186 A1 | 7/2003 | Gysling et al. | |
| 2003/0154036 A1 | 8/2003 | Gysling et al. | |
| 2004/0006409 A1 | 1/2004 | Liljenberg et al. | |
| 2004/0011141 A1 | 1/2004 | Lynworth | |
| 2004/0016284 A1 | 1/2004 | Gysling et al. | |
| 2004/0069069 A1 | 4/2004 | Gysling et al. | |
| 2004/0074312 A1 | 4/2004 | Gysling | |
| 2004/0144182 A1 | 7/2004 | Gysling et al. | |
| 2004/0167735 A1 | 8/2004 | Rothman et al. | |
| 2004/0168522 A1 | 9/2004 | Bailey et al. | |
| 2004/0168523 A1 | 9/2004 | Bailey et al. | |
| 2004/0194539 A1 | 10/2004 | Gysling | |
| 2004/0199340 A1 | 10/2004 | Gysling et al. | |
| 2004/0199341 A1 | 10/2004 | Gysling et al. | |
| 2004/0210404 A1 | 10/2004 | Gysling et al. | |
| 2004/0226386 A1 | 11/2004 | Croteau et al. | |
| 2004/0231431 A1 | 11/2004 | Bailey et al. | |
| 2004/0255695 A1 | 12/2004 | Gysling et al. | |
| 2005/0000289 A1 | 1/2005 | Gysling et al. | |
| 2005/0005711 A1 | 1/2005 | Gysling et al. | |
| 2005/0005712 A1 | 1/2005 | Gysling et al. | |
| 2005/0005713 A1 | 1/2005 | Winston et al. | |
| 2005/0005912 A1 | 1/2005 | Gysling et al. | |
| 2005/0011258 A1 | 1/2005 | Gysling et al. | |
| 2005/0011283 A1 | 1/2005 | Gysling et al. | |
| 2005/0011284 A1 | 1/2005 | Davis et al. | |
| 2005/0012935 A1 | 1/2005 | Kersey | |
| 2005/0033545 A1 | 2/2005 | Gysling | |
| 2005/0039520 A1 | 2/2005 | Davis et al. | |
| 2005/0044929 A1 | 3/2005 | Gysling et al. | |
| 2005/0044966 A1 | 3/2005 | Gysling et al. | |
| 2005/0050956 A1 | 3/2005 | Gysling et al. | |
| 2005/0061060 A1 | 3/2005 | Banach et al. | |
| 2005/0072216 A1 | 4/2005 | Engel | |
| 2005/0125166 A1 | 6/2005 | Loose et al. | |
| 2005/0125170 A1 | 6/2005 | Gysling et al. | |
| 2005/0159904 A1 | 7/2005 | Loose et al. | |
| 2005/0171710 A1 | 8/2005 | Gysling et al. | |
| 2005/0193832 A1 | 9/2005 | Tombs et al. | |
| 2005/0246111 A1 | 11/2005 | Gysling et al. | |
| 2006/0037385 A1 | 2/2006 | Gysling | |
| 2006/0048583 A1 | 3/2006 | Gysling | |
| 2006/0053809 A1 | 3/2006 | Gysling et al. | |
| 2006/0169058 A1 | 8/2006 | Gysling | |
| 2006/0212231 A1 | 9/2006 | Bailey | |

| | | |
|---|---|---|
| 2006/0266127 A1 | 11/2006 | Gysling et al. |
| 2007/0005272 A1 | 1/2007 | Gysling |

FOREIGN PATENT DOCUMENTS

| | | |
|---|---|---|
| EP | 0290336 | 11/1988 |
| EP | 1186868 | 3/2002 |
| GB | 2210169 | 6/1989 |
| WO | WO 91/14382 | 7/1993 |
| WO | WO 93/14382 | 7/1993 |
| WO | WO 99/67629 | 12/1999 |
| WO | WO 00/00793 | 1/2000 |
| WO | WO 0000793 | 1/2000 |
| WO | WO 00/46583 | 8/2000 |
| WO | WO 01/02810 | 1/2001 |
| WO | 01/21298 | 5/2001 |
| WO | 01/69040 | 9/2001 |
| WO | 0169040 | 9/2001 |
| WO | WO 02/50511 | 6/2002 |
| WO | WO2004/063741 | 7/2004 |
| WO | 2005/116637 | 12/2005 |

OTHER PUBLICATIONS

"Noise and Vibration Control Engineering Principles and Applications", Leo L. Beranek and Istvan L. Ver, A. Wiley Interscience Publicaton, pp. 537-541, Aug. 1992.

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"Viscous Attentuation of Acoustic Waves in Suspensions" by R.L. Gibson, Jr. and M.N. Toksoz.

Acoustic definition, Retrieved from the internet http://www.m-2.com/dictionary/acoustic>.

"Flow Velocity Measurement using Spatial Filter" Yoshio Kurita, Takaharu Matsumoto, Yukitake Shibata—Nov. 1979.

Sonar-Based Volumetric Flow Meter For Pulp and Paper Applications—Daniel L. Gysling & Douglas H. Loose—Dec. 13, 2003.

Sonar-Based Volumetric Flow Meter for Chemical and Petrochemical Applications—Daniel L. Gysling & Douglas H. Loose—Feb. 14, 2003.

New Flowmeter Principle—By Walt Boyes—Flow Control Magazine—Oct. 2003 Issue.

Sonar Gets into the Flow—Daniel L. Gysling and Douglas H. Loose—Modern Process—Jan. 2004.

Piezo Film Sensors Technical Manual—Measurement Specialties Inc.—Sensor Products Division Apr. 2, 1999.

U.S. Appl. No. 11/268,815, filed Nov. 2005, Gysling, et al.

\* cited by examiner

APPARATUS AND METHOD FOR MEASURING A PARAMETER OF A MULTIPHASE FLOW

CROSS-REFERENCE TO RELATED PATENT APPLICATIONS

This application is a continuation in part of U.S. patent application Ser. No. 11/442,954, filed May 30, 2006, which claimed the benefit of U.S. Provisional Application No. 60/685,532 filed May 27, 2005; and U.S. Provisional Application No. 60/736,684, filed Nov. 14, 2005; and claims the benefit of U.S. Provisional Patent Application No. 60/758,242 filed Jan. 10, 2006, which are incorporated herein by reference in their entirety.

TECHNICAL FIELD

This invention relates to an apparatus for measuring a parameter of a process flow passing within a pipe, and more particularly to a flow measurement apparatus having ultrasonic sensors and an array of strain-based sensors and for processing data signals therefrom to provide an output indicative of the speed of sound propagating through the process flow and/or a flow parameter of the process flow passing through a pipe.

BACKGROUND ART

In industrial applications that involve flowing fluids, such as slurries, liquids, chemical, paper, pulp, petroleum, gas, pharmaceutical, food, mining, minerals and vapors and gasses in refinery, it is sometimes beneficial to know certain characteristics of the flowing fluids. For example, in the petroleum industry in which billions of dollars of crude oil are fiscally measured each day on its way from the well heads to the refineries, the volumetric flow rate is a critical measurement in process control and optimization. Unfortunately however, large amounts of hydrocarbons tend to be present in crude oil and as such, during transport between the well heads and the refineries the crude oil has a propensity to 'out gas' during transport resulting in small, unknown levels of entrained gases being present at the fiscal measurement locations. This is undesirable for at least two (2) reasons.

First, because the effect of the entrained gases on most known liquid volumetric technologies results in an over reporting of the liquid component flow rate by an amount equal to the volume of the entrained gases, the measured volumetric flow rate is typically inaccurate. In fact, standards have been imposed for volumetric flow. Unfortunately, however, while most standards for fiscal volumetric flow of liquids require that the liquid be completely devoid of gases, a problem arises when it becomes impractical to ensure that the liquid stream in question is indeed completely devoid of free gases. This is because although the gas volume fraction (GVF) level is typically less than 1%, it is often the primary source of error in the fiscal measurement. Second, because the complete separation of the gas and liquid phases cannot be ensured, the liquid volume determination is also typically inaccurate resulting in inaccurate watercut values. Thus, it is reasonable to expect that if more characteristics are known about the flowing fluid, there will be a better chance of effectively measuring, controlling, and optimizing the processing of the flowing fluid.

Accuracy of oil production measurement is limited to three constraints. One constraint involves the inability to ensure the complete separation of gas and liquid flow. This constraint results in an inaccurate liquid volume determination, inaccurate gas volume determination and an inaccurate watercut determination. The second constraint involves the relatively low number of flow measurements available due to maintenance requirements, installation requirements and pressure drop in the point with any increase in measurement points. The third constraint involves the very low number of watercut measurement points, which is due to the reliability of the watercut measurement devices and the calibration requirements of the meters.

Thus, it would be advantageous, particularly in the oil and production field, to have a reliable, non-intrusive, clamp-on apparatus capable of measuring the parameters of an aerated multiphase fluid flow, such as the volumetric flow rate liquid of the process flow, the gas volume (or void) fraction of the flow, the watercut of the flow, and the volumetric flow rate of each of the phases of the flow. The present invention provides such an apparatus.

SUMMARY OF THE INVENTION

An apparatus for determining a characteristic of an aerated fluid flowing within a pipe, wherein the apparatus includes at least one first sensing device associated with the pipe. The at least one first sensing device is configured to sense a low-frequency component and a high-frequency component of the aerated fluid flow, wherein the at least one first sensing device generates first sensor data responsive to the low-frequency component of the aerated fluid and second sensor data responsive to the high-frequency component of the aerated fluid flow. Additionally, at least one second sensing device is included and is associated with the pipe to sense predetermined parameters of the aerated fluid flow and to generate third sensor data responsive to the predetermined parameters of the aerated fluid flow. Furthermore, a processing device is included, wherein the processing device is communicated with the at least one first sensing device and the at least one second sensing device to receive and process the first sensor data, the second sensor data and the third sensor data to generate fluid data responsive to a characteristic of the aerated fluid flow.

The foregoing and other objects, features and advantages of the present invention will become more apparent in light of the following detailed description of exemplary embodiments thereof.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike:

FIG. 11 is a schematic diagram of a flow logic of an array processor of a flow measuring apparatus in accordance with the present invention.

DETAILED DESCRIPTION

Figure 1:
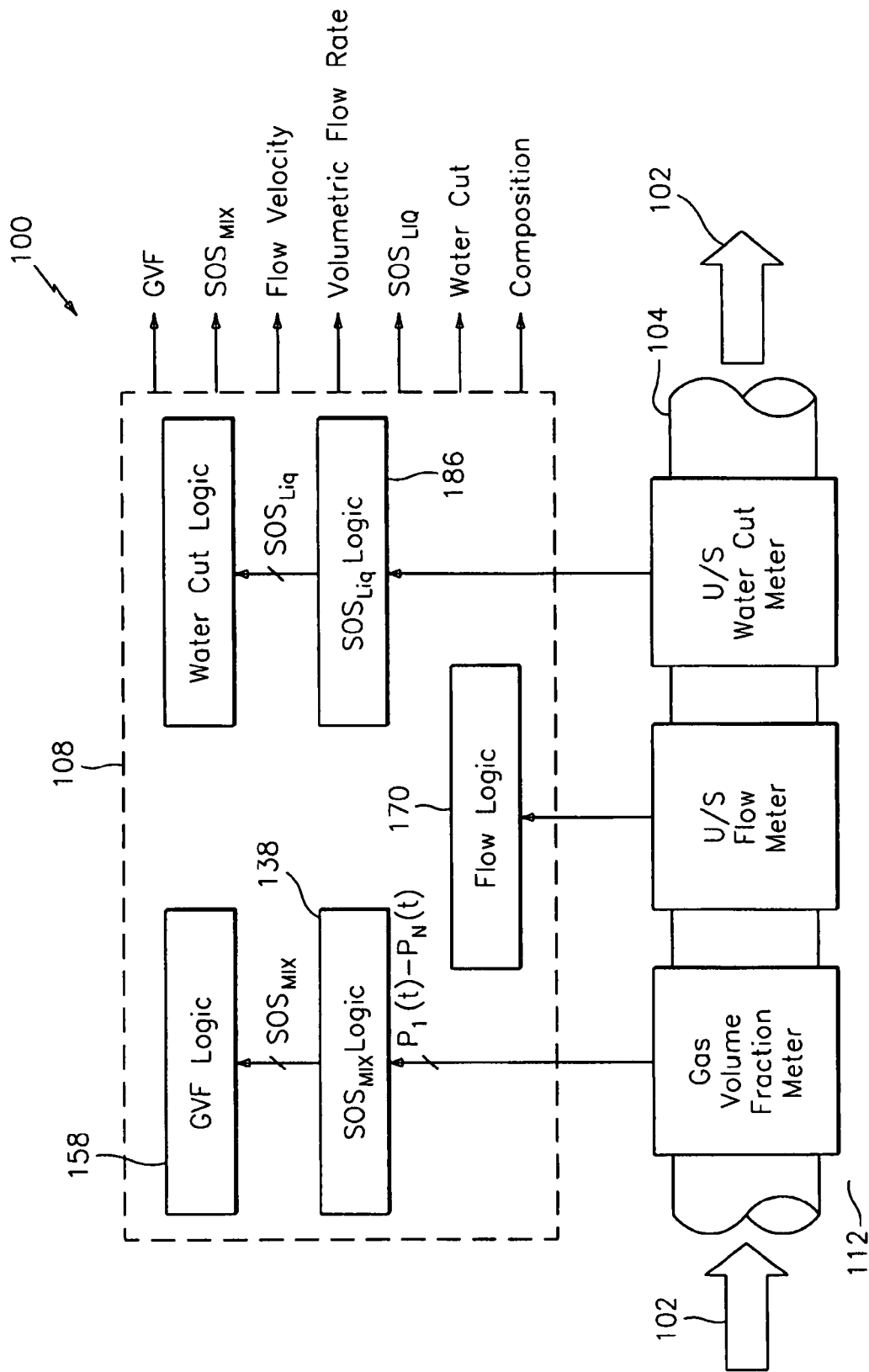
FIG. 1 is a block diagram of a flow measurement apparatus having an array of strain-based sensors and an array of ultrasonic sensors for measuring parameters of a multiphase flow in accordance with the present invention.

FIG. 1 illustrates a block diagram of a flow measurement device 100 for measuring a parameter of a multiphase flow 102 passing through a pipe 104. The multiphase flow or mixture 102 includes any mixture having any combination of a gas, liquid, or solid phase and while the present invention is particularly useful in measuring multiphase flows, it should be appreciated that the apparatus 100 can also measure a parameter of a single phase flow. As discussed hereinbefore, the apparatus embodying the present invention is useful in measuring a multiphase flow comprising oil, water and gas. The description of the present invention will therefore assume that the mixture is a combination of oil, water, and gas, however, the invention contemplates that any single or multiphase flow can be measured.

As shown in FIG. 1, the apparatus 100 functions as a gas volume fraction (or void fraction) meter, an ultrasonic flow meter, and an ultrasonic watercut meter. The gas volume fraction (GVF) meter provides an output indicative of the gas volume fraction or void fraction of the mixture 102 by measuring the speed of sound propagating at low frequencies axially through the flow 102 in the pipe 104. The ultrasonic flow meter provides a plurality of high frequency acoustic signals through the flow 102 to provide output signals indicative of pressure disturbances (e.g., vortical disturbances) propagating with the flow 102 past the ultrasonic sensors, which will be described in greater detail hereinafter. The ultrasonic watercut meter measures the speed of sound of a high frequency signal propagating through the flow 102 to provide an output signal indicative of the speed of sound of the liquid, which is indicative of the watercut of the mixture 102, wherein watercut is the phase fraction or percentage of the water in the flow 102.

It should be appreciated that the combination of the GVF meter, flow meter and watercut meter provides sufficient information to fully characterize the multiphase fluid 102 flowing through the pipe 104. Specifically, the apparatus 100 is capable of measuring at least the flow velocity, the volumetric flow rate, the flow composition (e.g., phase fraction), the watercut, the volumetric flow rate of a phase of the mixture, the gas volume (void) fraction of the flow, the speed of sound of the mixture, and the speed of sound of the liquid. One can appreciate that these measured parameters are particularly important in oil production applications.

Figure 2:
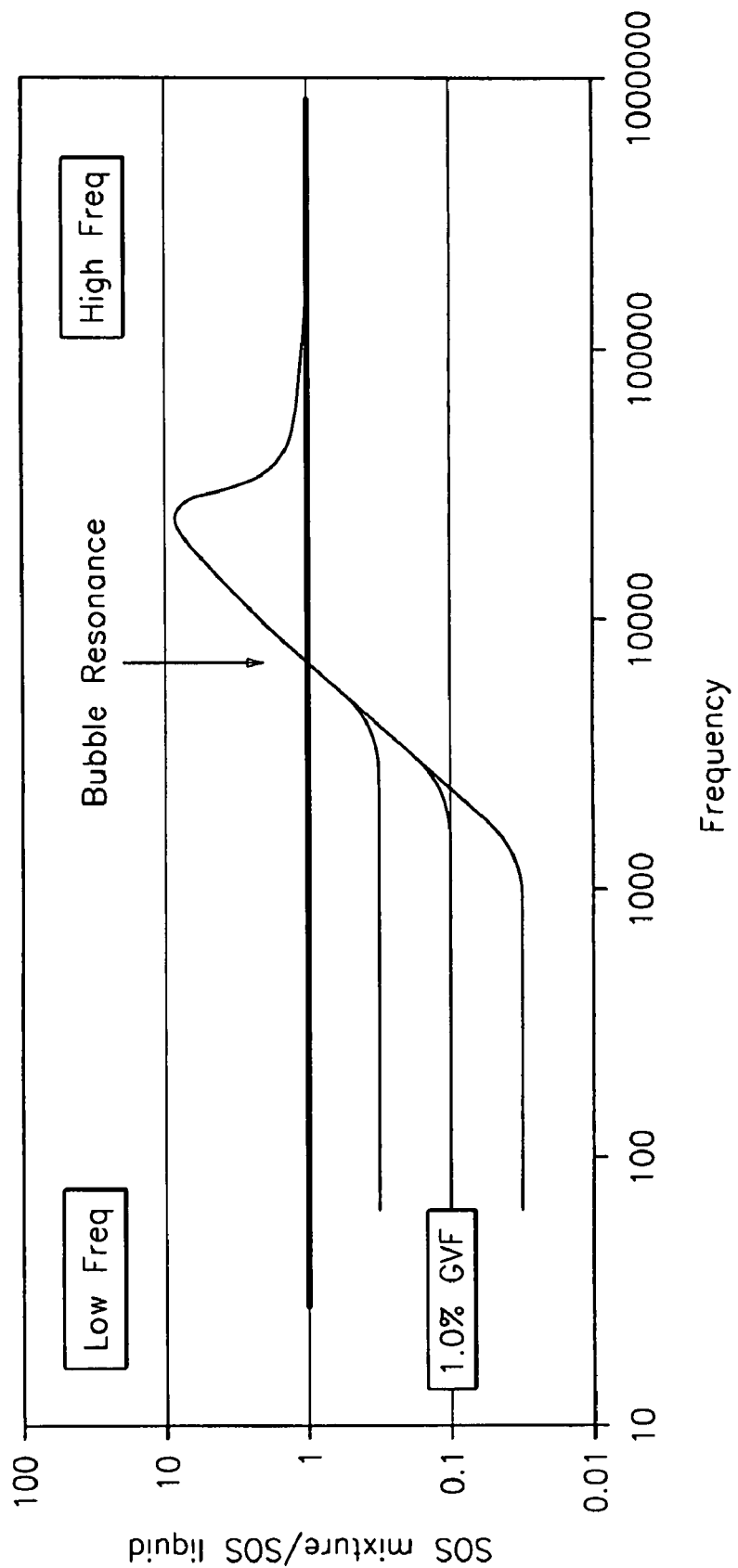
FIG. 2 is a plot of the measured speed of sound normalized to the speed of sound of the liquid over a frequency range in accordance with the present invention.

One important aspect of the present invention involves the recognition that a frequency dependence of the speed of sound propagating through the fluid flow 102 exists for bubbly fluids, wherein the bubble resonance determines the transition frequency. FIG. 2 illustrates the frequency dependence of the speed of sound in bubbly fluids. As shown, at lower frequencies below the bubble resonant frequency (approximately 100 Hz to 1000 Hz), the speed of sound propagating through the fluid 102 is dramatically influenced by entrained gases. Conversely, at higher frequencies above the bubble resonant frequency (approximately 1 MHz and greater), entrained gas in the fluid flow 102 has no significant impact on the speed of sound propagating through the liquid. Recognizing this phenomenon, the apparatus 100 embodying the present invention provides a meter, such as a GVF meter, to measure the speed of sound at low frequencies below the bubble resonant frequency, and another meter, such as an ultrasonic watercut meter, to measure the speed of sound at high frequencies above the bubble resonant frequency.

As will be described in greater detail hereinafter, the measured speed of sound at the lower frequency (e.g., sub-resonant frequencies) is indicative of the speed of sound of the mixture 102, while the measured speed of sound at the higher frequencies (e.g., super-resonant frequencies) is indicative of the speed of sound of the liquid. Knowing the speed of sound of the mixture 102 enables the gas volume (and void) fraction of the flow 102 (or mixture) to be determined. Further, knowing the speed of sound of the liquid enables the watercut to be determined. This processing will be described in greater detail hereinafter.

Figure 3:
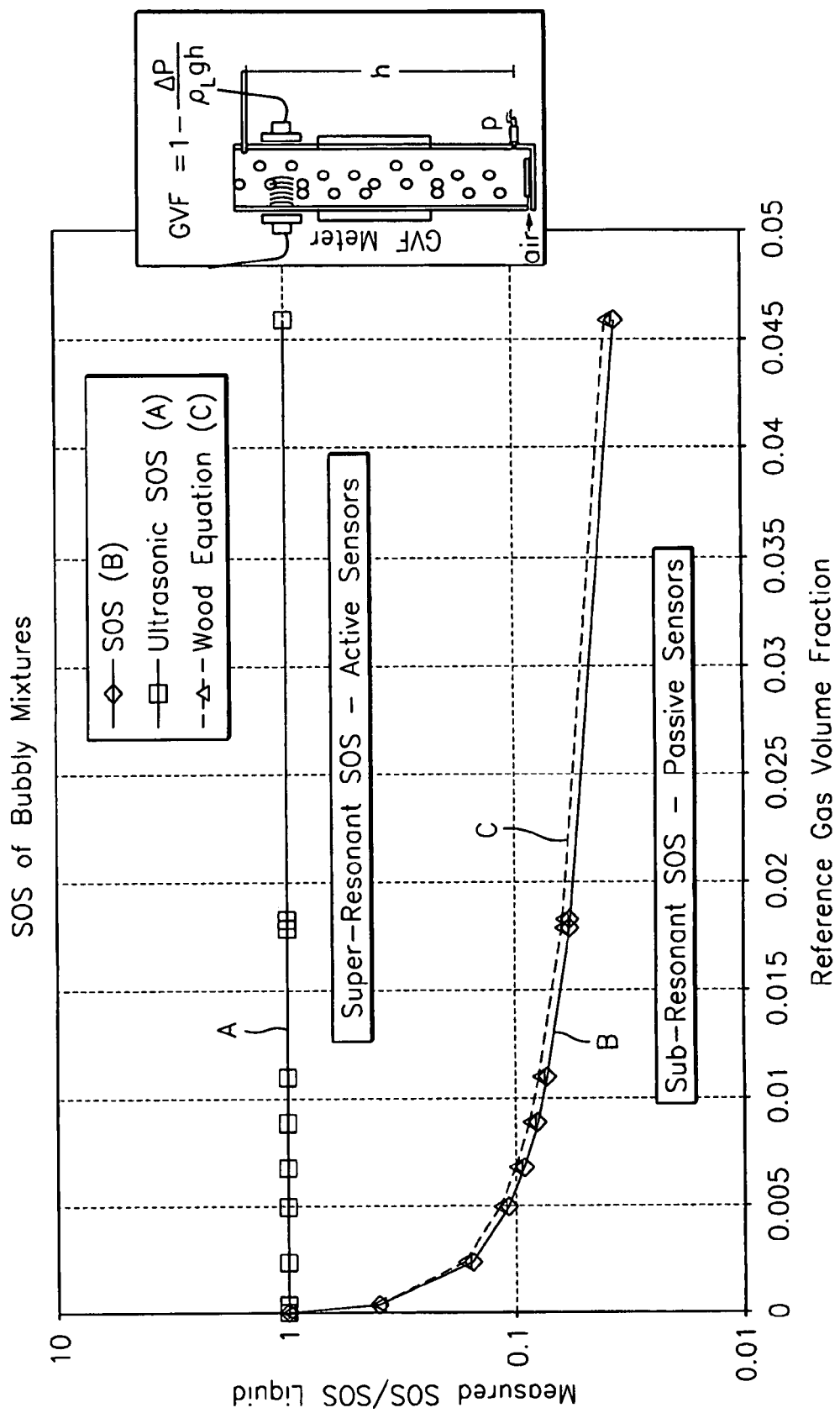
FIG. 3 is a plot of the measured speed of sound normalized to the speed of sound of the liquid as a function of gas volume fraction in accordance with the present invention.

Tests were performed using a vertical pipe filled with a fluid, wherein bubbles were injected into the fluid at the bottom of the pipe. Using an ultrasonic sensor and a GVF meter, the speed of sound at super-resonant frequencies and sub-resonant frequencies, respectively, were measured. Referring to FIG. 3, the data obtained illustrates the phenomenon described hereinbefore that the measured speed of sound of the liquid (e.g., super-resonant SOS) is not affected by the entrained gas, while the measured speed of sound of the mixture 102 (e.g., sub-resonant SOS) is affected by the entrained gas. Additionally, the data in FIG. 3, illustrates the effects of the speed of sound of bubble mixtures or flows 102. Specifically, the measured speed of sound normalized by the liquid speed of sound is plotted as a function of the reference gas volume fraction.

The line A in FIG. 3 shows the normalized measured super-resonant speed of sound as a function of the referenced GVF. As discussed hereinbefore, the measured speed of sound at higher frequencies (super-resonant) is not affected by entrained gas and is indicative of the speed of sound of the liquid regardless of the amount of entrained gas.

The line B in FIG. 3 shows the normalized measured sub-resonant speed of sound as a function of the referenced GVF. As discussed hereinbefore, the measured sound speed at lower frequencies (sub-resonant) is affected by entrained gas by a known or determinable relationship, thus enabling the determination of the gas volume (or void) fraction of the multiphase flow or mixture 102.

The line C in FIG. 3 shows the theoretical normalized sub-resonant speed of sound of the mixture 102 as a function of the referenced GVF in accordance with the Woods equation. As can be seen, the measured sub-resonant speed of sound correlates with the theoretical determination of the sub-resonant speed of sound.

Figure 4:
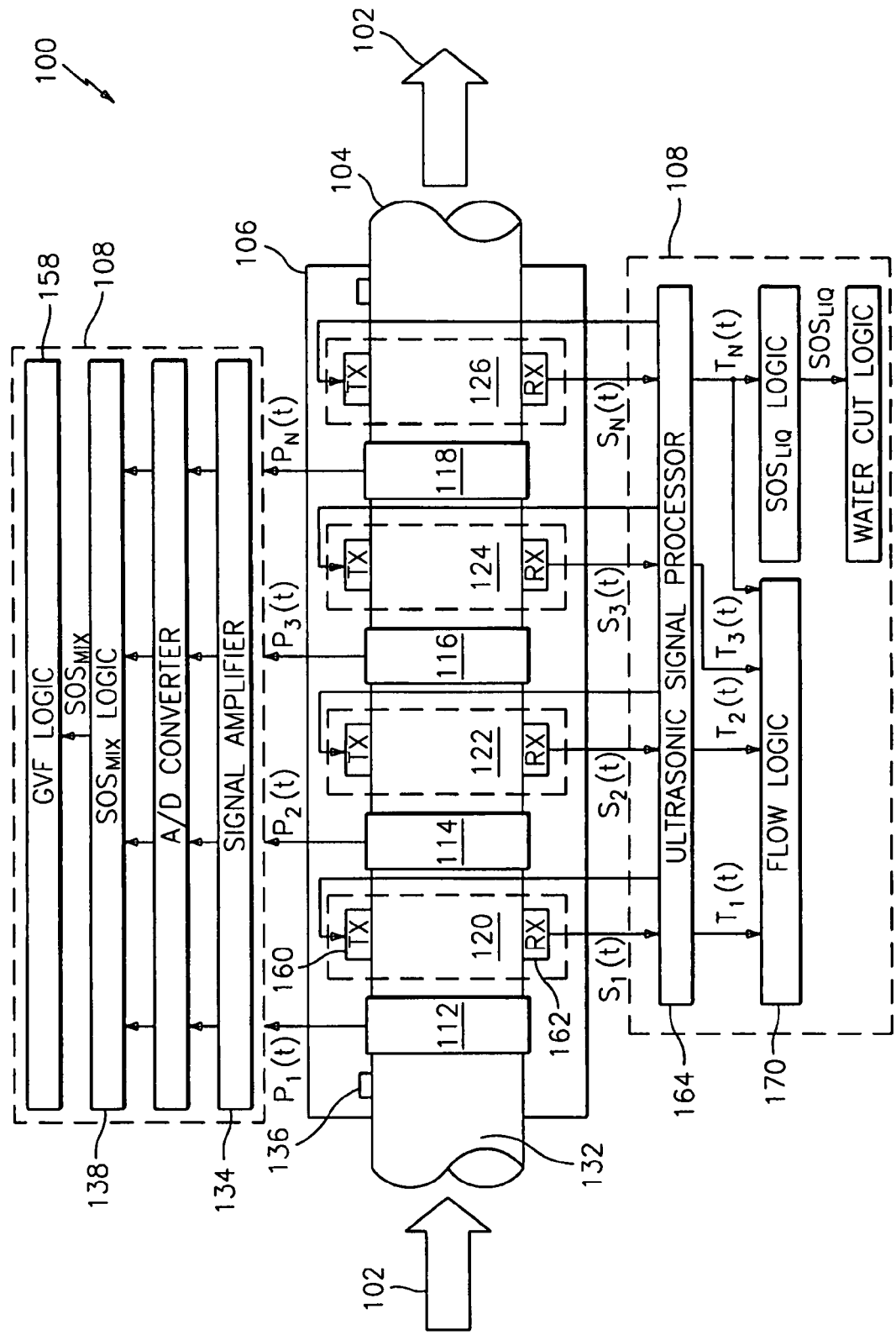
FIG. 4 is a schematic diagram of a flow measurement apparatus of FIG. 1 having an array of strain-based sensors and an array of ultrasonic sensors for measuring parameters of a multiphase flow.
Figure 5:
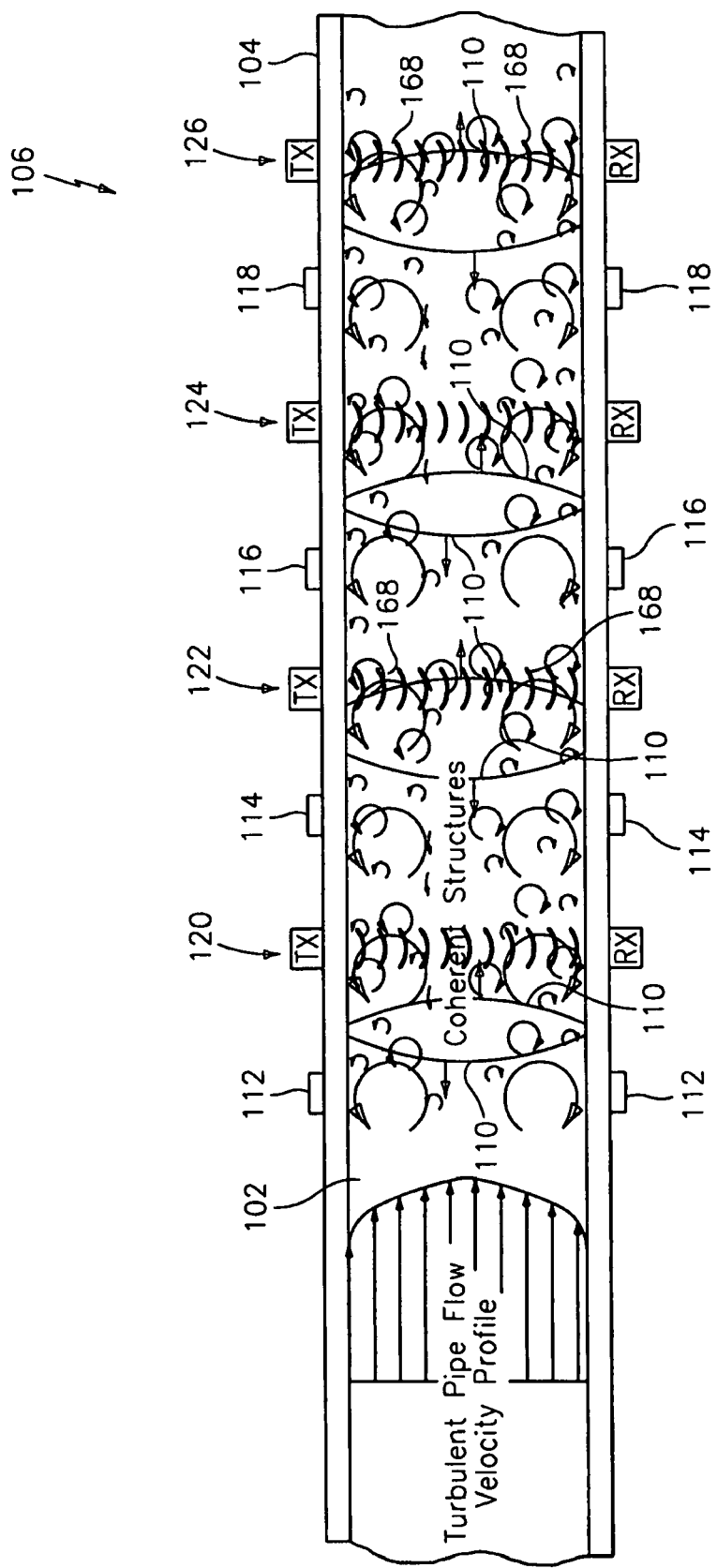
FIG. 5 is a cross-sectional view of a pipe having a turbulent fluid flow or mixture flowing therein, the flow having coherent structures therein, namely acoustic waves and vortical disturbances, in accordance with the present invention.

Referring to FIG. 4 a schematic diagram of the flow measurement apparatus 100 of FIG. 1 is illustrated, wherein the flow measurement apparatus 100 includes a sensing device (sensor head) 106 mounted to a pipe 104 and a processing unit or array processor (transmitter) 108. In accordance with the present invention, the apparatus 100 can determine the speed at which sound (i.e., acoustic wave 110 in FIG. 5) propagates through the fluid flow 102 within the pipe 104 to measure particular characteristics of the single or multi-phase fluids. To simplify the explanation of the present invention, the flow 102 propagating through the pipe 104 will be referred to as a process flow with the understanding that the fluid or process flow 102 may be a single phase or multi-phase flow, as described hereinbefore.

The sensing device 106 comprises an array of strain-based sensors or pressure sensors 112-118 for measuring the unsteady pressures produced by acoustic pressure disturbances (e.g., acoustic waves 110) within the pipe 104 to determine the speed of sound propagating through the flow 102. The sensing device 106 further includes an array of ultrasonic sensors 120-126, each of which have a transmitter 160 and a receiver 162 to also measure a parameter of the flow 102. Although the pressure sensors 112-118 and ultrasonic sensors 120-126 are shown interlaced, it should be appreciated that each respective sensor array may be partially interlaced or not interlaced at all without departing from the present invention. It is also contemplated that the GVF meter and the ultrasonic flow meter may be two distinct units disposed adjacent to each other on the pipe 104.

The pressure signals $P_1(t)$-$P_N(t)$ generated by the pressure sensors 112-118 and the ultrasonic signals $S_1(t)$-$S_N(t)$ generated by the ultrasonic sensors 120-126 are provided to the processing unit 108, which digitizes the signals and computes the appropriate flow parameter(s). A cable electronically connects the sensing device 106 to the processing unit 108. The analog pressure sensor signals $P_1(t)$-$P_N(t)$ are typically 4-20 mA current loop signals.

The array of pressure sensors 112-118 comprises an array of at least two pressure sensors 118, 120 spaced axially along the outer surface 132 of the pipe 104, having a process flow 102 propagating therein. The pressure sensors 112-118 may be clamped onto or generally removably mounted to the pipe 104 by any releasable fastener, such as bolts, screws and clamps. Alternatively, the sensors 112-118 may be permanently attached to or integral (e.g., embedded) with the pipe 104. It should be appreciated that the array of sensors 112-118 of the sensing device 106 may include any number of pressure sensors 18-21 greater than two sensors, such as three, four, eight, sixteen or N number of sensors between two and twenty-four sensors. Generally, the accuracy of the measurement improves as the number of sensors in the array increases, wherein the degree of accuracy provided by the greater number of sensors is typically offset by the increase in complexity and time for computing the desired output parameter of the flow 102. Therefore, the number of sensors used is dependent at least in part on the degree of accuracy desired and the desire update rate of the output parameter provided by the apparatus 100. The pressure sensors 112-118 measure the unsteady pressures produced by acoustic waves propagating through the flow 102 within the pipe 104, which are indicative of the SOS propagating through the fluid flow 102 in the pipe 104. The output signals ($P_1(t)$-$P_N(t)$) of the pressure sensors 112-118 are provided to a signal amplifier 134 that amplifies the signals generated by the pressure sensors 112-118. The processing unit 108 processes the pressure measurement data $P_1(t)$-$P_N(t)$ and determines the desired parameters and characteristics of the flow 102, as described hereinbefore.

The apparatus 100 also contemplates providing one or more acoustic sources 136 to enable the measurement of the speed of sound propagating through the flow 102 for instances of acoustically quiet flow. The acoustic source 136 may be a device that taps or vibrates on the wall of the pipe 104, for example. The acoustic sources 136 may be disposed at the input end or the output end of the array of sensors 112-118, or at both ends as shown. One should appreciate that in most instances the acoustic sources 136 are not necessary and the apparatus 100 passively detects the acoustic ridge provided in the flow 102, as will be described in greater detail hereinafter. The passive noise includes noise generated by pumps, valves, motors, and the turbulent mixture itself.

Figure 6:
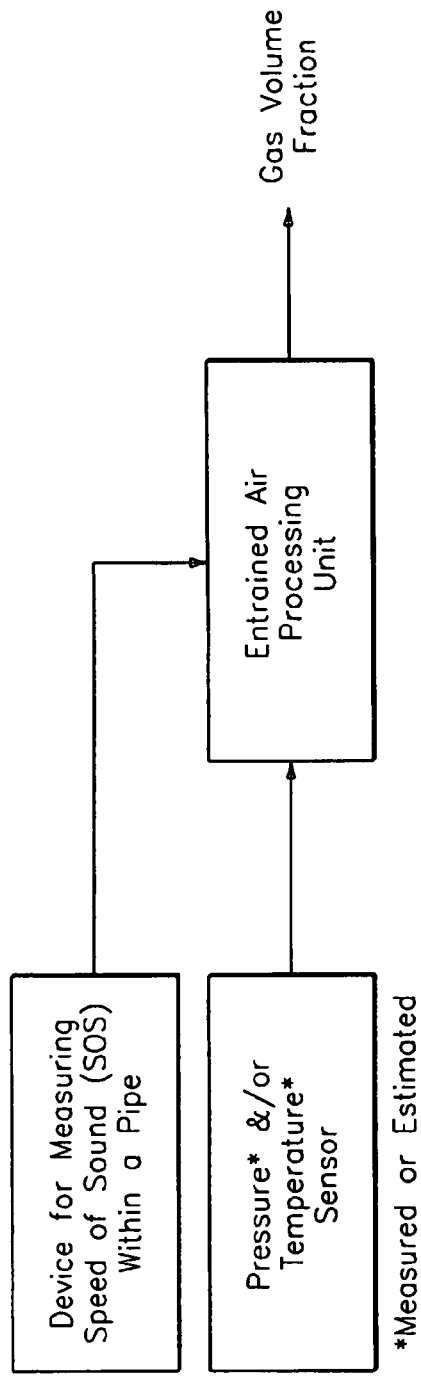
FIG. 6 is a block diagram of the GVF Logic in accordance with the present invention.
Figure 7:
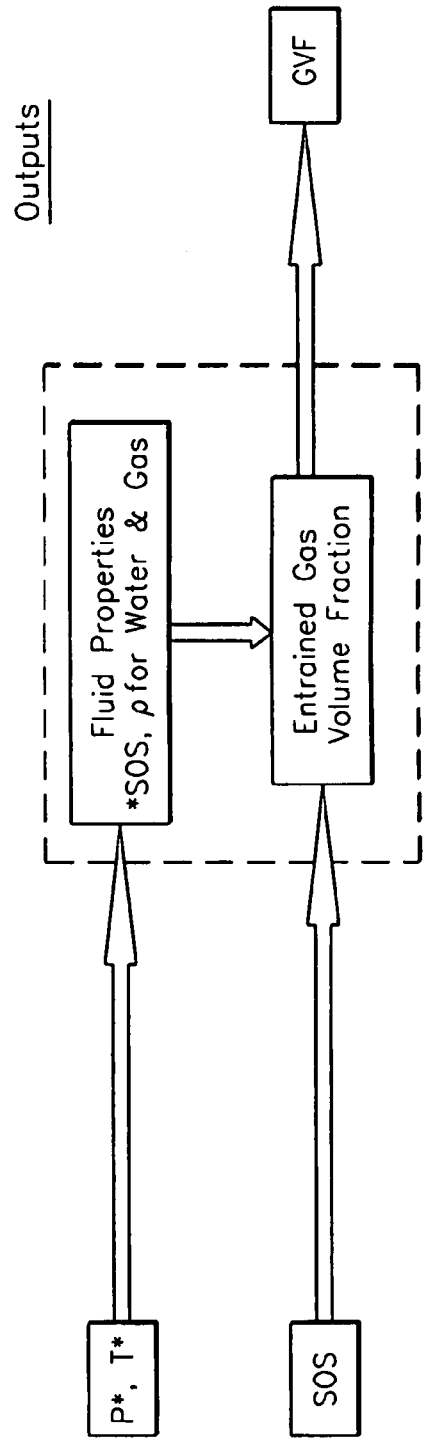
FIG. 7 is a block diagram of the GVF Logic in accordance with the present invention.

Generally, the processing unit 108 measures unsteady pressures created by acoustical disturbances propagating through the flow 102 to determine the speed of sound (SOS) propagating through the flow 102. Knowing the pressure and/or temperature of the flow 102 and the speed of sound of the acoustic disturbances or waves, as shown in FIG. 6 and FIG. 7, the processing unit 108 can determine the volumetric flow of the fluid, the consistency or composition of the fluid, the Mach number of the fluid, the average size of particles flowing through the fluid, the air/mass ratio of the fluid, and/or the percentage of entrained air within the mixture 102, such as that described in U.S. patent application Ser. No. 10/349,716, filed Jan. 23, 2003, U.S. patent application Ser. No. 10/376,427, filed Feb. 26, 2003, U.S. patent application Ser. No. 10/762,410, filed Jan. 21, 2004, which are all incorporated by reference.

As shown in FIG. 4, an apparatus 100 embodying the present invention has an array of at least two strain-based or pressure sensors 112-114, located at two locations $x_1$, $x_2$ axially along the pipe 104 for sensing respective stochastic signals propagating between the sensors 112-114 within the pipe 104 at their respective locations. Each sensor 112-114 provides a signal indicating an unsteady pressure at the location of each sensor, at each instant in a series of sampling instants. One should appreciate that the sensor array may include more than two pressure sensors as depicted by pressure sensors 116, 118 at location $x_3$, $x_N$. The pressure generated by the acoustic waves 110 (see FIG. 5) may be measured through strained-based sensors and/or pressure sensors 112-118. The pressure sensors 112-118 provide analog pressure time-varying signals $P_1(t), P_2(t), P_3(t), P_N(t)$ to the signal processing unit 108.

Figure 8:
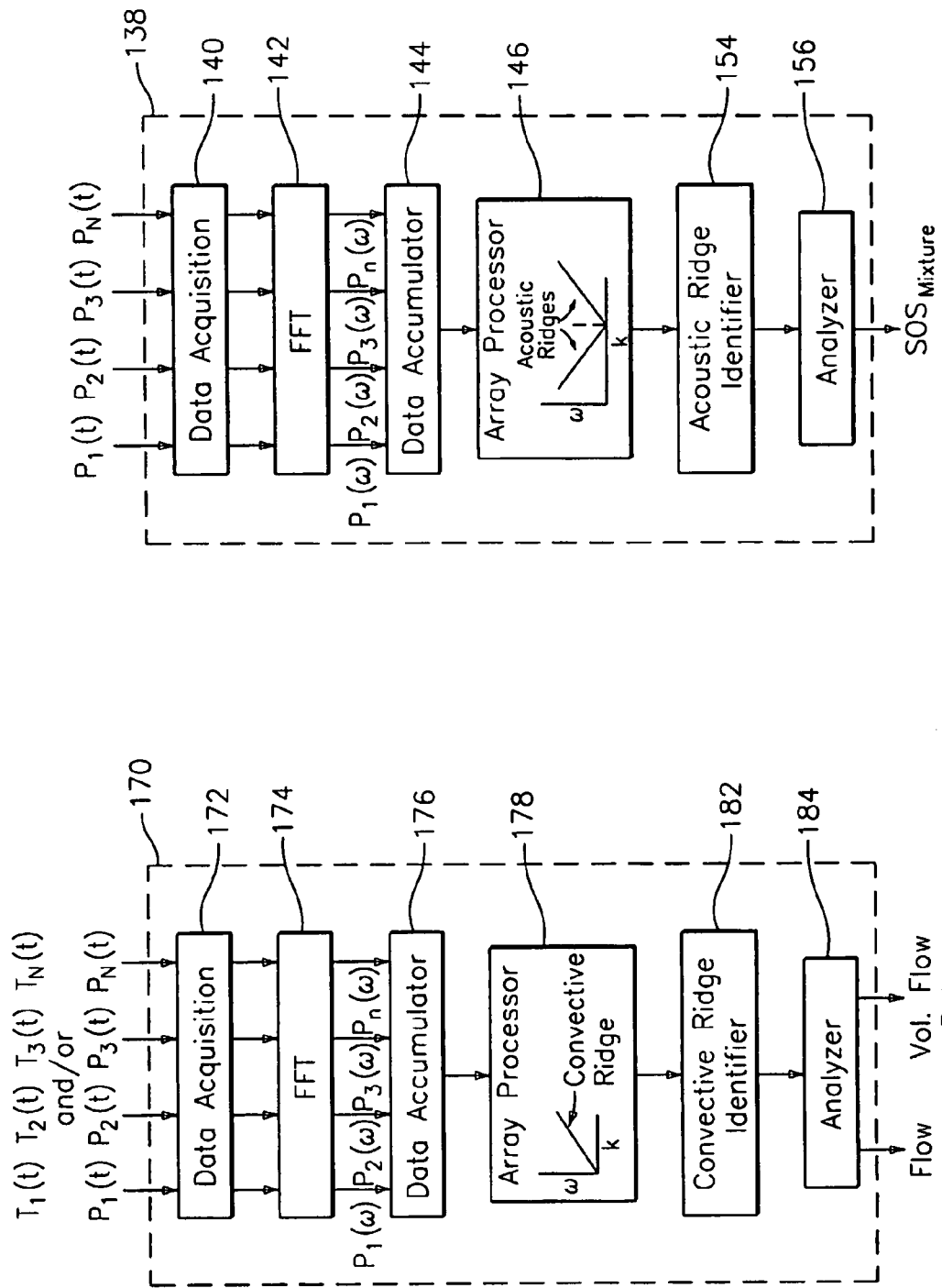
FIG. 8 is a schematic diagram of a speed of sound (SOS) logic of an array processor of a flow measuring apparatus in accordance with the present invention.

As shown in FIG. 8, the SOS Mixture Logic 138 includes a data acquisition unit 140 that digitizes the pressure signals $P_1(t)$-$P_N(t)$ associated with the acoustic waves 110 propagating through the pipe 104. An FFT logic 142 calculates the Fourier transform of the digitized time-based input signals $P_1(t)$-$P_N(t)$ and provide complex frequency domain (or frequency based) signals $P_1(\omega), P_2(\omega), P_3(\omega), P_N(\omega)$ indicative of the frequency content of the input signals.

A data accumulator 144 accumulates the signals $P_1(t)$-$P_N(t)$ from the sensors, and provides the data accumulated over a sampling interval to an array processor 146, which performs a spatial-temporal (two-dimensional) transform of the sensor data, from the xt domain to the k-$\omega$ domain, and then calculates the power in the k-$\omega$ plane, as represented by a k-$\omega$ plot, similar to that provided by the convective array processor 178 discussed further hereinafter.

To calculate the power in the k-$\omega$ plane, as represented by a k-$\omega$ plot (see FIG. 9) of either the signals or the differenced signals, the array processor 146 determines the wavelength and so the (spatial) wavenumber k, and also the (temporal) frequency and so the angular frequency $\omega$, of various of the spectral components of the stochastic parameter. There are numerous algorithms available in the public domain to perform the spatial/temporal decomposition of the array of pressure sensors 112-118.

Specifically, the array processor 146 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

Figure 9:
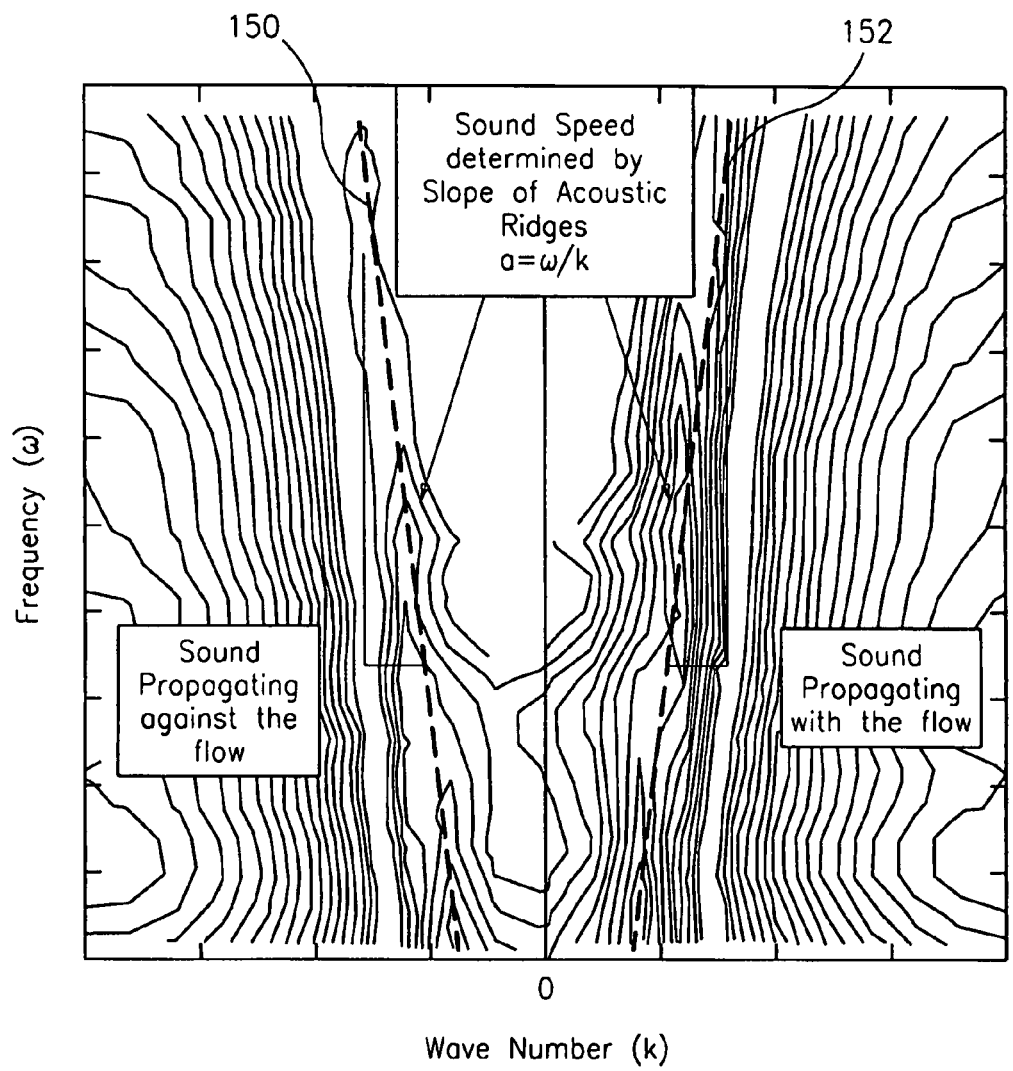
FIG. 9 is a kω plot of data processed from an apparatus embodying the present invention that illustrates the slopes of a pair of acoustic ridges, in accordance with the present invention.

One such technique of determining the speed of sound propagating through the flow 102 involves using array processing techniques to define an acoustic ridge in the k-$\omega$ plane as shown in FIG. 9. The slope of the acoustic ridge is indicative of the speed of sound propagating through the flow 102. The speed of sound (SOS) is determined by applying sonar arraying processing techniques to determine the speed at which the one dimensional acoustic waves 110 propagate past the axial array of unsteady pressure measurements distributed along the pipe 104.

The apparatus 100 of the present invention measures the speed of sound (SOS) of one-dimensional sound waves 110 (see FIG. 5) propagating through the mixture 102 to determine the gas volume fraction of the mixture 102. It is known that sound propagates through various mediums at various speeds in such fields as SONAR and RADAR fields. The speed of sound propagating through the pipe 104 and flow 102 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which are incorporated herein by reference.

In the case of suitable acoustic waves 110 being present in both axial directions, the power in the k-$\omega$ plane shown in a k-$\omega$ plot of FIG. 9 so determined will exhibit a structure that is called an acoustic ridge 150, 152 in both the left and right planes of the plot, wherein one of the acoustic ridges 150 is indicative of the speed of sound traveling in one axial direction and the other acoustic ridge 152 being indicative of the speed of sound traveling in the other axial direction.

The acoustic ridges 150, 152 represent the concentration of a stochastic parameter that propagates through the flow 102 and is a mathematical manifestation of the relationship between the spatial variations and temporal variations described above. Such a plot will indicate a tendency for k-$\omega$ pairs to appear more or less along a line 150, 152 with some slope, the slope indicating the speed of sound. The power in the k-$\omega$ plane so determined is then provided to an acoustic ridge identifier 154, which uses one or another feature extraction method to determine the location and orientation (slope) of any acoustic ridge 150, 152 present in the left and right k-$\omega$ plane. An analyzer 156 determines the speed of sound of the mixture 102 by using the slope of one of the two acoustic ridges 150, 152 or averaging the slopes of the acoustic ridges 150, 152.

As shown in FIG. 1 and FIG. 4, the GVF logic 158 provides output signals indicative of gas volume or void fraction of the mixture 102 in response to the measured speed of sound of the mixture 102. For example, to determine the gas volume fraction (or phase fraction), the GVF logic 158 assumes a nearly isothermal condition for the flow 102. As such the gas volume fraction or the void fraction is related to the speed of sound by the following quadratic equation:

$$Ax^2 + Bx + C = 0$$

wherein x is the speed of sound, $A = 1 + rg/rl*(K_{eff}/P - 1) - K_{eff}/P$, $B = K_{eff}/P - 2 + rg/rl$; $C = 1 - K_{eff}/rl*a_{meas}^2)$; Rg=gas density, rl=liquid density, $K_{eff}$=effective K (modulus of the liquid and pipewall), P=pressure, and $a_{meas}$=measured speed of sound.

Effectively, $$\text{Gas Volume Fraction (GVF)} = (-B + \text{sqrt}(B^2 - 4*A*C))/(2*A)$$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix} a_{mix\infty}^2} = \sum_{i=1}^{N} \frac{\phi_i}{\rho_i a_i^2} \quad \text{where} \quad \rho_{mix} = \sum_{i=1}^{N} \rho_i \phi_i$$

One dimensional compression waves propagating within a mixture 102 contained within a pipe 104 exerts an unsteady internal pressure loading on the pipe 104. The degree to which the pipe 104 displaces as a result of the unsteady pressure loading influences the speed of propagation of the compression wave. The relationship among the infinite domain speed of sound and density of a mixture, the elastic modulus (E), thickness (t), and radius (R) of a vacuum-backed cylindrical conduit, and the effective propagation velocity ($a_{eff}$) for one dimensional compression is given by the following expression:

$$a_{\mathit{eff}} = \cfrac{1}{\sqrt{\cfrac{1}{a_{\mathit{mix}\infty}^2} + \rho_{\mathit{mix}} \cfrac{2R}{Et}}} \quad \text{(eq 1)}$$

Figure 10:
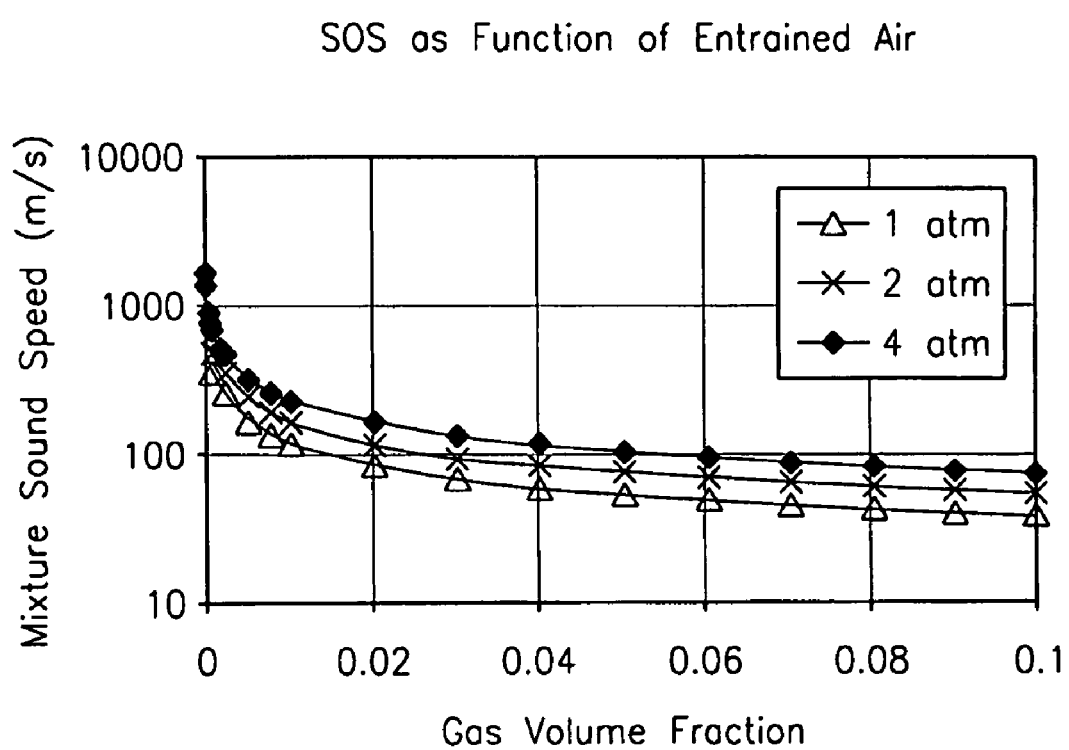
FIG. 10 is a plot of mixture sound speed as a function of gas volume fraction over a range of process pressures, in accordance with the present invention.

The mixing rule essentially states that the compressibility of a mixture ($1/(\rho a^2)$) is the volumetrically-weighted average of the compressibilities of the components. For gas/liquid mixtures 102 at pressure and temperatures typical of the paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 10.

Some or all of the functions within the processing unit 108 may be implemented in software (using a microprocessor or computer) and/or firmware, or may be implemented using analog and/or digital hardware, having sufficient memory, interfaces, and capacity to perform the functions described herein.

As shown in FIG. 4, the measurement apparatus 100 includes a sensing device 106 comprising an array of ultrasonic sensor units 120-126. Each sensor unit 120-126 comprises a pair of ultrasonic sensors 160, 162, one of which functions as a transmitter (Tx) 160 and the other as a receiver (Rx) 162. The sensor units 120-126 are spaced axially along the outer surface 132 of the pipe 104 having a process flow 102 propagating therein. The pair of sensors 160, 162 is diametrically disposed on the pipe 104 at predetermined locations along the pipe 104 to provide a through transmission configuration, such that the sensors transmit and receive an ultrasonic signal that propagates through the fluid substantially orthogonal to the direction of the flow of the fluid within the pipe 104. The ultrasonic measurement portion of the present invention is similar to that shown in U.S. patent application No. 10/756,977 filed on Jan. 13, 2004, which is incorporated herein by reference.

As shown in FIG. 1, each pair of ultrasonic sensors 160, 162 measures a transit time (i.e., time of flight (TOF), or phase modulation) of an ultrasonic signal propagating through the fluid 102 from the transmitting sensor 160 to the receiving sensor 162. The transit time measurement or variation is indicative of coherent properties that convect with the flow within the pipe 104 (e.g., vortical disturbances, inhomogenieties within the flow, temperature variations, bubbles, particles, pressure disturbances), which are indicative of the velocity of the process flow 102. The ultrasonic sensors 160, 162 may operate at any frequency, however, it has been found that the higher frequency sensors are more suitable for single phase fluids while lower frequency sensors are more suitable for multiphase fluids. The optimum frequency of the ultrasonic sensors 160, 162 is dependent on the size or type of particle or substance propagating with the flow 102. For instance, the larger the air bubbles in an aerated fluid the lower the desirable frequency of the ultrasonic signal. Examples of frequency used for a flow meter embodying the present invention are 1 MHz and 5 MHz. The ultrasonic sensors 160, 162 may also provide a pulsed, chirped or continuous signal through the fluid flow 102. An example of the sensors 160, 162 that may be used are Model no. 113-241-591, manufactured by Krautkramer.

An ultrasonic signal processor 164 fires the sensors 160, 162 in response to a firing signal from the transmitter 108 and receives the ultrasonic output signals $S_1(t)$-$S_N(t)$ from the sensors 160, 162. The signal processor 164 processes the data from each of the sensor units 120-126 to provide an analog or digital output signal $T_1(t)$-$T_N(t)$ indicative of the time of flight or transit time of the ultrasonic signal through the fluid. The signal processor 164 may also provide an output signal indicative of the amplitude (or attenuation) of the ultrasonic signals. One such signal processor is model no. USPC 2100 manufactured by Krautkramer Ultrasonic Systems. Measuring the amplitude of ultrasonic signals is particularly useful and works best for measuring the velocity of a fluid that includes a substance in the flow (e.g., multiphase fluid or slurry).

The output signals ($T_1(t)$-$T_N(t)$) of the ultrasonic signal processor 164 are provided to the processor 108, which processes the transit time or modulation measurement data to determine the volumetric flow rate. The transit time or time of flight measurement is defined by the time it takes for an ultrasonic signal to propagate from the transmitting sensor 160 to the respective receiving sensor 162 through the pipe wall and the fluid 102. The effect of the vortical disturbances (and/or other inhomogenities within the fluid) on the transit time of the ultrasonic signal is to delay or speed up the transit time. Therefore, each sensing unit 120-126 provides a respective output signal $T_1(t)$-$T_N(t)$ indicative of the variations in the transit time of the ultrasonic signals propagating orthogonal to the direction of the fluid 102. The measurement is derived by interpreting the convecting coherent property and/or characteristic within the process piping using at least two sensor units 120, 122. The ultrasonic sensors 120-126 may be "wetted" or clamped onto the outer surface 132 of the pipe 104 (e.g. contact or non-contact sensor).

In one example, the flow meter 100 measures the volumetric flow rate by determining the velocity of vortical disturbances or "eddies" 168 (see FIG. 5) propagating with the flow 102 using the array of ultrasonic sensors 120-126. The flow meter 100 measures the velocities associated with unsteady flow fields created by vortical disturbances or "eddies" 168 and other inhomogenities to determine the velocity of the flow 102. The ultrasonic sensor units 120-126 measure the transmit time $T_1(t)$-$T_N(t)$ of the respective ultrasonic signals between each respective pair of sensors 160, 162, which vary due to the vortical disturbances as these disturbances convect within the flow 102 through the pipe 104 in a known manner. Therefore, the velocity of these vortical disturbances is related to the velocity of the flow 102 and hence the volumetric flow rate may be determined, as will be described in greater detail hereinafter. The volumetric flow is determined by multiplying the velocity of the fluid by the cross-sectional area of the pipe 104.

The Flow Logic 170 of the processing unit 108 processes the ultrasonic signals as shown in FIG. 11, wherein the Flow Logic 170 receives the ultrasonic signals from the array of sensors 120-126. A data acquisition unit 172 (e.g., A/D converter) converts the analog signals to respective digital signals and the digitized signals are provided to Fast Fourier Transform (FFT) logic 174. The FFT logic 174 calculates the Fourier transform of the digitized time-based input signals $T_1(t)$-$T_N(t)$ and provides complex frequency domain (or frequency based) signals $T_1(\omega)$, $T_2(\omega)$, $T_3(\omega)$, $T_N(\omega)$ indicative of the frequency content of the input signals. It should be appreciated that instead of FFTs, any other technique for obtaining the frequency domain characteristics of the signals $T_1(t)$-$T_N(t)$, may be used. For example, the cross-spectral density and the power spectral density may be used to form one or more frequency domain transfer functions (or frequency responses or ratios) discussed hereinafter.

One technique of determining the convection velocity of the turbulent eddies 168 within the process flow 102 (see FIG. 5) is by characterizing a convective ridge of the resulting unsteady pressures using an array of sensors or other beam forming techniques, similar to that described in U.S. Pat. No.6,889,562 and U.S. Pat. No. 6,609,069, which are incorporated herein by reference.

A data accumulator 176 accumulates the frequency signals $T_1(\omega)$-$T_N(\omega)$ over a sampling interval, and provides the data to an array processor 178, which performs a spatial-temporal (two-dimensional) transform of the sensor data, from the xt domain to the k-$\omega$ domain, and then calculates the power in the k-$\omega$ plane, as represented by a k-$\omega$ plot.

The array processor 178 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $k=\omega/u$, where u is the convection velocity (flow velocity). A plot of k-$\omega$ pairs is obtained from a spectral analysis of sensor samples associated with convective parameters. The pairings are portrayed so that the energy of the disturbance spectrally corresponding to the pairings that can be described as a substantially straight ridge, a ridge that in turbulent boundary layer theory is called a convective ridge. What is being sensed are not discrete events of turbulent eddies 168, but rather a continuum of possibly overlapping events forming a temporally stationary, essentially white process over the frequency range of interest. In other words, the convective eddies 168 are distributed over a range of length scales and hence temporal frequencies.

To calculate the power in the k-$\omega$ plane, as represented by a k-$\omega$ plot (see FIG. 12) of either the signals, the array processor 178 determines the wavelength and so the (spatial) wavenumber k, and also the (temporal) frequency and so the angular frequency $\omega$, of various of the spectral components of the stochastic parameter. There are numerous algorithms available in the public domain to perform the spatial/temporal decomposition of arrays of sensor units 120-126.

The present invention may use temporal and spatial filtering to precondition the signals to effectively filter out the common mode characteristics $P_{common\ mode}$ and other long wavelength (compared to the sensor spacing) characteristics in the pipe 104 by differencing adjacent sensors and retaining a substantial portion of the stochastic parameter associated with the flow field and any other short wavelength (compared to the sensor spacing) low frequency stochastic parameters.

Figure 12:
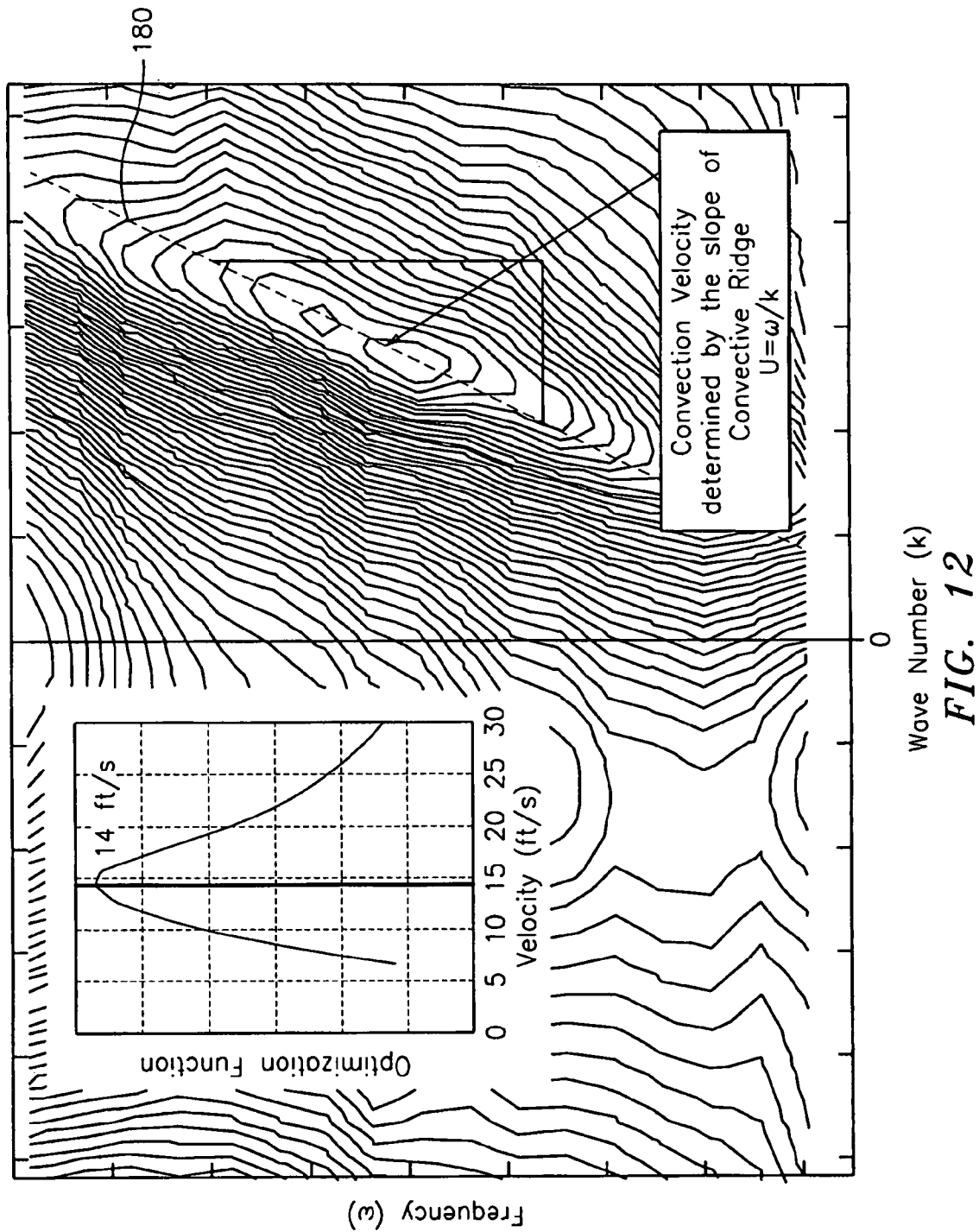
FIG. 12 a kω plot of data processed from an apparatus embodying the present invention that illustrates the slope of a convective ridge, and a plot of the optimization function of the convective ridge, in accordance with the present invention.

In the case of suitable turbulent eddies 168 (see FIG. 5) being present, the power in the k-$\omega$ plane shown in a k-$\omega$ plot of FIG. 12 shows a convective ridge 180. The convective ridge 180 represents the concentration of a stochastic parameter that convects with the flow 102 and is a mathematical manifestation of the relationship between the spatial variations and temporal variations described above. Such a plot will indicate a tendency for k-$\omega$ pairs to appear more or less along a line 180 with some slope, the slope indicating the flow velocity.

Once the power in the k-$\omega$ plane is determined, a convective ridge identifier 182 uses one or another feature extraction method to determine the location and orientation (slope) of any convective ridge 180 present in the k-$\omega$ plane. In one embodiment, a so-called slant stacking method is used, a method in which the accumulated frequency of k-$\omega$ pairs in the k-$\omega$ plot along different rays emanating from the origin are compared, each different ray being associated with a different trial convection velocity (in that the slope of a ray is assumed to be the flow velocity or correlated to the flow velocity in a known way). The convective ridge identifier 182 provides information about the different trial convection velocities, information referred to generally as convective ridge information.

The analyzer 184 examines the convective ridge information including the convective ridge orientation (slope). Assuming the straight-line dispersion relation given by $k=\omega/u$, the analyzer 184 determines the flow velocity, Mach number and/or volumetric flow. The volumetric flow is determined by multiplying the cross-sectional area of the inside of the pipe 104 with the velocity of the process flow 102.

The watercut of the process flow 102 is determined using the output of at least one of the sensors 120-126 of the ultrasonic flow meter. While an ultrasonic sensor 120 of the ultrasonic meter is used to determine the watercut of the flow 102, it is contemplated that a separate ultrasonic sensor may be used to determine watercut. A separate ultrasonic sensor for measuring watercut would allow the sensor to transmit an ultrasonic signal at different frequencies to ensure the ultrasonic sensor for watercut is operating at a frequency greater than the bubble resonant frequency.

Figure 13:
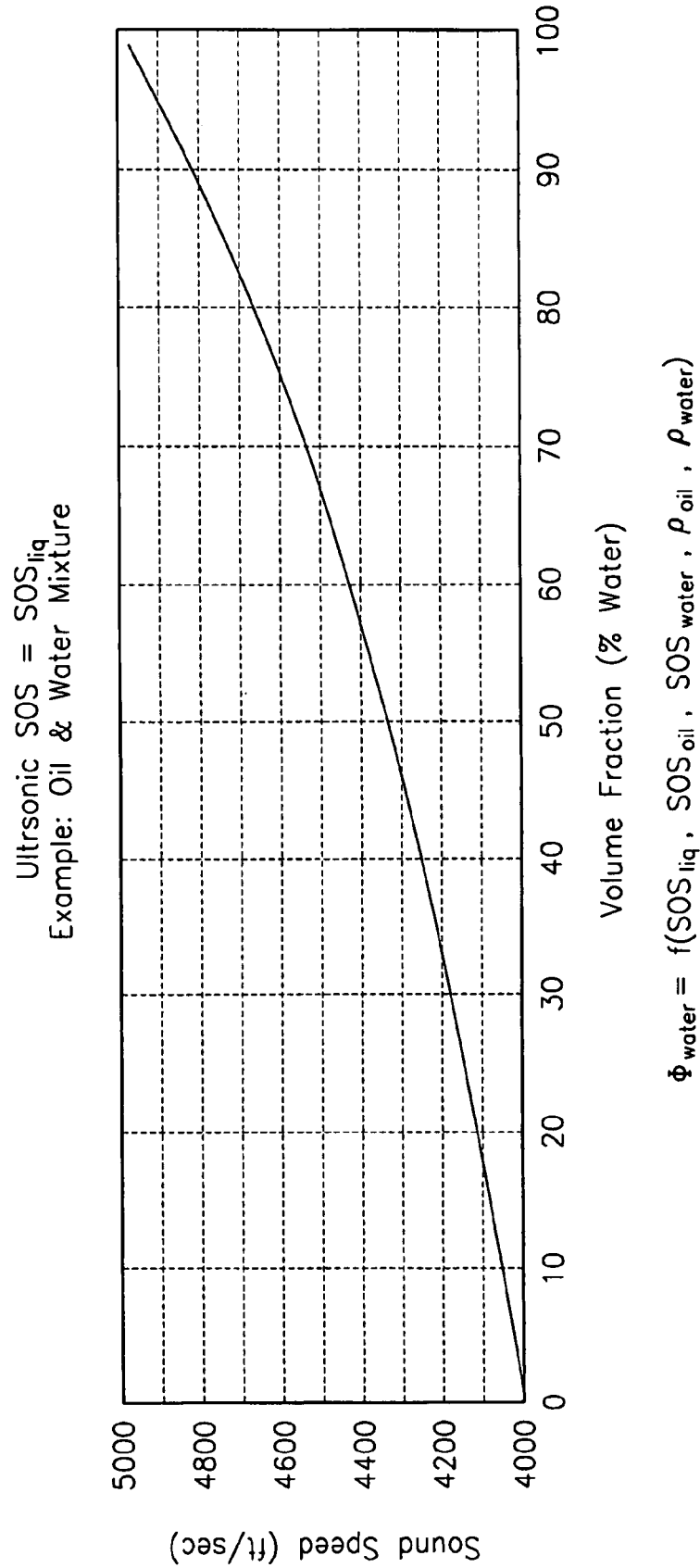
FIG. 13 is a plot of the speed of sound of the liquid as a function of the volume fraction of the water in the multiphase flow in accordance with the present invention.

The SOS Liquid Logic 186 converts the measured transit time of the ultrasonic signal to a signal indicative of the speed of sound of the liquid. The frequency of the ultrasonic signal propagating through the fluid is greater than the bubble resonant frequency such that the entrained gas does not affect the ultrasonic signal. Knowing the SOS of the liquid portion of the fluid flow 102, the phase fraction of the water can be determined. The phase fraction of the water is a function of the SOS of the liquid, the SOS of the oil, SOS of the water, the density of the oil, and the density of the water. Knowing the SOS and density of the oil and water, the relationship between the phase fraction (e.g., watercut) of the flow 102 and the SOS of the liquid is known. As shown in FIG. 13, this relationship is illustrated in the plot of SOS of the liquid v. watercut, and therefore, knowing the SOS of the liquid, the watercut may be determined.

While the sonar-based flow meter using an array of sensors to measure the speed of sound of an acoustic wave propagating through the mixture 102 is shown and described, one will appreciate that any means for measuring the speed of sound of the acoustic wave may used to determine the entrained gas volume fraction of the mixture/fluid or other characteristics of the flow 102 described hereinbefore.

While data acquisition units 140, 172, FFT logic 142, 174, data accumulators 144, 176, array processors 146, 178 and ridge identifiers 154, 182 are shown as separate elements or separate software/processing routines, one will appreciate that each of these elements may be common and able to process the data associated with both the pressure signals associated with the speed of sound and the pressures that convect with the process flow.

While each of the ultrasonic sensor units 120-126 of FIG. 1 comprises a pair of ultrasonic sensors (transmitter and receiver) 160, 162 diametrically-opposed to provide through transmission, the present invention contemplates that one of the ultrasonic sensors 160, 162 of each sensor unit 120-126 may be offset axially such that the ultrasonic signal from the transmitter sensor 160 has an axial component in its propagation direction.

The present invention also contemplates the sensor units 120-126 of the sensing device 106 may be configured in a pulse/echo configuration. In this embodiment, each sensing unit 120-126 comprises one ultrasonic sensor that transmits an ultrasonic signal through the pipe wall and fluid substantially orthogonal to the direction of flow and receives a reflection of the ultrasonic signal reflected back from the wall of the pipe to the ultrasonic sensor.

The sensing device 106 may be configured to function in a pitch and catch configuration. In this embodiment, each sensor unit 120-126 comprises a pair of ultrasonic sensors (transmitter, receiver) 160, 162 disposed axially along the pipe 104 disposed on the same side of the pipe 104 at a predetermined distance apart. Each transmitter sensor 160 provides an ultrasonic signal at a predetermined angle into the flow 102. The ultrasonic signal propagates through the fluid 102 and reflects off the inner surface of the pipe 104 and reflects the ultrasonic signal back through the fluid to the respective receiver sensor 162.

As shown in FIG. 1, while the ultrasonic sensor portion of the flow measurement device 100 comprises an array of ultrasonic sensor units 120-126 (see FIG. 5), the present invention contemplates that any ultrasonic meter or sensing portion may be used. The ultrasonic meter may be any meter within any of the three classes of flow meters that utilize ultrasonic transducers, which include transit time ultrasonic flow meters (TTUF), doppler ultrasonic flow meters (DUF), and cross correlation ultrasonic flow meters (CCUF).

The ultrasonic sensor portion may be any known ultrasonic flow meter, such as U.S. Pat. Nos. 2,874,568; 4,004,461; 6,532,827; 4,195,517; 5,856,622; and 6,397,683, which are all incorporated herein by reference.

It should be appreciated that the array-based flow meter 100 is similar to that described in U.S. patent application Ser. No. 10/007,749 filed Nov. 7, 2001, U.S. patent application Ser. No. 10/007,736 filed Nov. 8, 2001, U.S. Pat. No. 6,587,798, filed on Nov. 28, 2001, U.S. Provisional Patent Application, Ser. No. 60/359,785 filed Feb. 26, 2002, U.S. Provisional Patent Application, Ser. No. 60/425,436 filed Nov. 12, 2002, U.S. patent application Ser. No. 09/729,994, filed Dec. 4, 2000, and U.S. patent application Ser. No. 10,875,857 filed Jun. 24, 2004, which are all incorporated herein by reference.

While a single array processor 108 is shown to receive and process input signals from the pressure sensors 112-118 and the ultrasonic sensors 120-126, the present invention contemplates that an array processor may be dedicated to each of the array of pressure sensors 112-118 and the array of ultra-sonic sensors 120-126.

Figure 14:
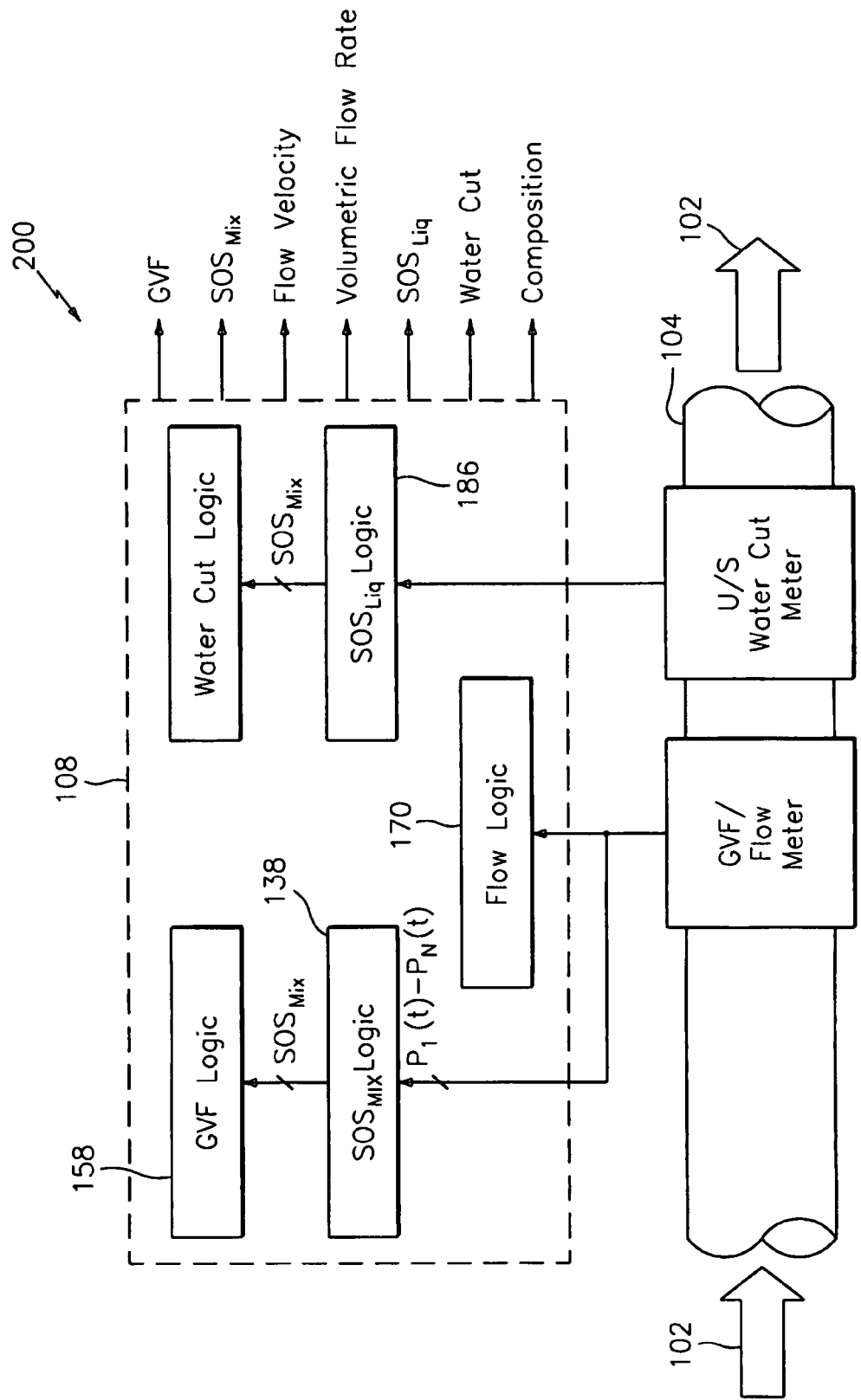
FIG. 14 is a block diagram of another embodiment of a flow measurement apparatus having an array of strain-based sensors and ultrasonic sensors for measuring parameters of a multiphase flow in accordance with the present invention.

FIG. 14 illustrates a block diagram of a flow measurement apparatus 200 similar to the apparatus 100 of FIG. 1 that includes a sensing device (sensor head) 106 mounted to a pipe 104 and a processing unit or array processor (transmitter) 108, wherein the apparatus 200 functions as a GVF meter, a flow meter, and a watercut meter. In this embodiment, the sensor head 106 for the GVF meter functions as the sensor head 106 for both the GVF meter and flow meter of FIG. 1. It should be appreciated that the processing of all the data is similar to that described hereinbefore and like reference numbers are the same elements and function the same as that described herein before.

Figure 15:
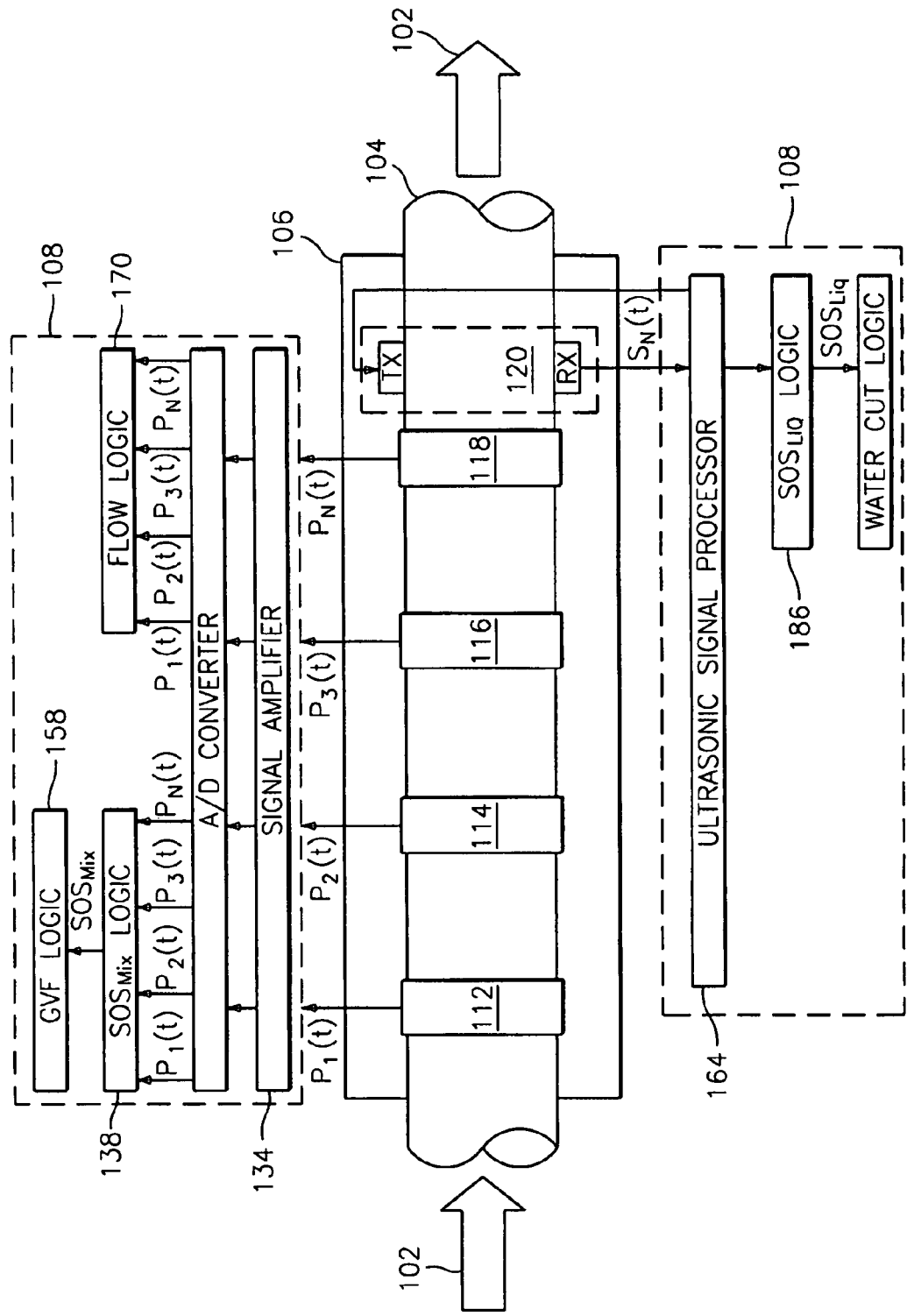
FIG. 15 is a schematic diagram of a flow measurement apparatus of FIG. 14 having an array of strain-based sensors and an array of ultrasonic sensors for measuring parameters of a multiphase flow.

Referring to FIG. 15, the sensor head 106 includes an array of strained-based or pressure sensors 112-118. The signals provided by the pressure sensors 112-118 are processed to determine the gas volume (or void) fraction of the flow 102, the velocity of the flow 102, the volumetric flow rate, and speed of sound of the mixture (i.e., flow) 102. The combination GVF/flow meter, in accordance with the present invention, can determine the speed at which sound (i.e., acoustic wave 110 in FIG. 5) propagates through the fluid flow 102 within a pipe 104 to measure the speed of sound of the mixture 102 and the gas void (or volume) fraction of the flow 102. The GVF/flow meter also determines the speed at which pressure disturbances (e.g., vortical disturbances) propagate through the pipe 104 to determine the velocity of the fluid flow 102. The pressure disturbances may be in the form of vortical disturbances 168 (e.g., turbulent eddies 168 in FIG. 5) or other pressure disturbances that convect (or propagate) with the flow 102.

As suggested and further described in greater detail hereinafter, the apparatus 100, 200 has the ability to measure the speed of sound (SOS) and flow rate (or velocity) using one or both of the following techniques using the same array of pressure sensors described herein below:

1) Determining the speed of sound of acoustical disturbances or sound waves propagating through the flow 102 using the array of pressure sensors 112-118, and/or 2) Determining the velocity of pressure disturbances (e.g., vortical eddies 168) propagating through the flow 102 using the array of pressure sensors 112-118.

These techniques are similar to what was taught and described hereinbefore in reference to FIG. 8 and FIG. 11, respectively. Also, the processing relating to the watercut meter is similar to that described herein before.

One skilled in the art should appreciate that the watercut meter may also be used as a stand alone meter to enable a user to measure the watercut of a multiphase fluid flow having entrained air.

The pressure sensors 112-118 and the ultrasonic sensors 120-126 shown in the apparatus 100, 200 in FIG. 4 and FIG. 15, respectively, may be clamp-on, non-wetted sensors. These clamp-on sensors allow the apparatus 100, 200 to be retro fitted onto pipes without having to shut down the system. The apparatus 100, 200 also would not interfere with the fluid flow and not create any back pressure of the fluid flow. Another advantage of the non-wetted, clamped on sensors is that corrosion or scaling does not interfere with the sensors.

In one embodiment as shown in FIG. 4 and FIG. 15, each of the pressure sensors 112-118 may include a piezoelectric film attached to a unitary multi-band strap to measure the unsteady pressures of the flow 102 using either technique described hereinbefore. The piezoelectric film sensors 112-118 may be mounted onto a unitary substrate or web which is mounted or clamped onto the outer surface 132 of the pipe 104, which will described in greater detail hereinafter.

The piezoelectric film sensors 112-118 include a piezoelectric material or film 188 to generate an electrical signal proportional to the degree that the material is mechanically deformed or stressed. The piezoelectric sensing element 188 is typically conformed to allow complete or nearly complete circumferential measurement of induced strain to provide a circumferential-averaged pressure signal. The sensors can be formed from PVDF films, co-polymer films, or flexible PZT sensors, similar to that described in "Piezo Film Sensors Technical Manual" provided by Measurement Specialties, Inc., which is incorporated herein by reference. A piezoelectric film sensor that may be used for the present invention is part number 1-1002405-0, LDT4-028K, manufactured by Measurement Specialties, Inc. While the piezoelectric film material is provided substantially the length of the band, and therefore the circumference of the pipe 104, the present invention contemplates that the piezoelectric film material may be disposed along a portion of the band of any length less than the circumference of the pipe 104.

Piezoelectric film ("piezofilm"), like piezoelectric material, is a dynamic material that develops an electrical charge proportional to a change in mechanical stress. Consequently, the piezoelectric material measures the strain induced within the pipe 104 due to unsteady or stochastic pressure variations (e.g., vortical and/or acoustical) within the process flow 102. Strain within the pipe 104 is transduced to an output voltage or current by the attached piezoelectric sensor 112-118. The piezoelectrical material or film may be formed of a polymer, such as polarized fluoropolymer, polyvinylidene fluoride (PVDF). The piezoelectric film sensors are similar to that described in U.S. patent application Ser. No. 10/712,818, filed Nov. 12, 2003 and U.S. patent application Ser. No. 10/795,111, filed Mar. 4, 2004, which are incorporated herein by reference. The advantages of this clamp-on technique using piezoelectric film include non-intrusive flow rate measurements, low cost and measurement techniques that require no excitation source. One should appreciate that the sensor may be installed or mounted to the pipe 104 as individual sensors or all the sensors mounted as a single unit as shown in FIG. 4 and FIG. 15.

The pressure sensors 112-118 of FIG. 4 described herein may be any type of sensor, capable of measuring the unsteady (or ac or dynamic) pressures or parameters that convect with the flow within a pipe 104, such as piezoelectric, optical, capacitive, resistive (e.g., Wheatstone bridge), accelerometers (or geophones), velocity measuring devices, displacement measuring devices, ultra-sonic devices, etc. If optical pressure sensors are used, the sensors 112-118 may be Bragg grating based pressure sensors, such as that described in U.S. patent application Ser. No. 08/925,598, entitled "High Sensitivity Fiber Optic Pressure Sensor For Use In Harsh Environments", filed Sept. 8, 1997, now U.S. Pat. No. 6,016,702, and in U.S. patent application Ser. No. 10/224,821, entitled "Non-Intrusive Fiber Optic Pressure Sensor for Measuring Unsteady Pressures within a Pipe", which are incorporated herein by reference. In an embodiment of the present invention that utilizes fiber optics as the pressure sensors 112-118 they may be connected individually or may be multiplexed along one or more optical fibers using wavelength division multiplexing (WDM), time division multiplexing (TDM), or any other optical multiplexing techniques.

In certain embodiments of the present invention, a piezoelectronic pressure transducer may be used as one or more of the pressure sensors 112-118 and it may measure the unsteady (or dynamic or ac) pressure variations inside the pipe 104 by measuring the pressure levels inside of the pipe 104. These sensors may be ported within the pipe to make direct contact with the process flow 102. In an embodiment of the present invention, the sensors comprise pressure sensors manufactured by PCB Piezotronics. In one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems.

It is also within the scope of the present invention that any strain sensing technique may be used to measure the variations in strain in the pipe 104, such as highly sensitive piezoelectric, electronic or electric, strain gages and piezo-resistive strain gages attached to the pipe 104. Other strain gages include resistive foil type gages having a race track configuration similar to that disclosed U.S. patent application Ser. No. 09/344,094, filed Jun. 25, 1999, now U.S. Pat. No. 6,354,147, which is incorporated herein by reference. The invention also contemplates strain gages being disposed about a predetermined portion of the circumference of pipe 104. The axial placement of and separation distance $\Delta X_1$, $\Delta X_2$ between the strain sensors are determined as described hereinabove.

It is also within the scope of the present invention that any other strain sensing technique may be used to measure the variations in strain in the pipe 104, such as highly sensitive piezoelectric, electronic or electric, strain gages attached to or embedded in the pipe 104.

While the description has described the apparatus as a single meter that measures the GVF, Flow and watercut, each function may be separated into individual meters for measuring GVF, flow and watercut.

Figure 16:
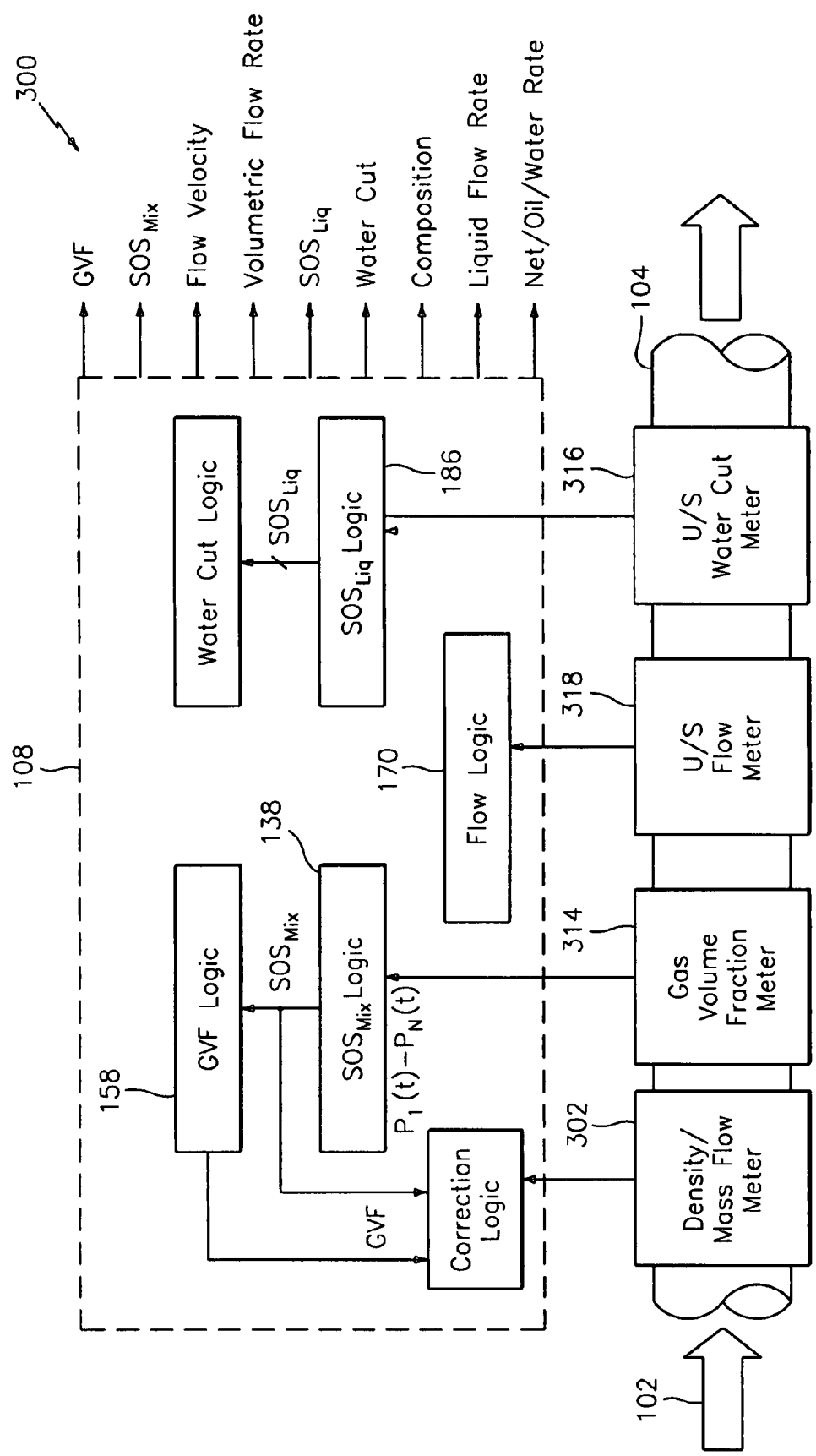
FIG. 16 is a schematic diagram of a flow measurement apparatus similar to that shown in FIG. 1 which includes a density and/or mass flow meter such as a coriolis meter.

Referring to FIG. 16, the description and function of the gas volume fraction meter, the ultrasonic flow meter and the ultrasonic watercut meter of the flow apparatus 300 are similar to that described hereinbefore. The flow apparatus includes a density and/or mass flow meter 302, such as a coriolis meter, to provide measurements of different parameters of the fluid flow 102. For example, the combination of the coriolis meter and the gas volume fraction meter may be an augmented output measurement of the density, mass flow, net oil flow rate, and net water flow rate (for a flow comprising an aerated oil/water mixture). This combination is similar to that described in U.S. patent application Ser. No. 10/892,886 filed Jul. 15, 2004, which is incorporated herein by reference.

For example, one approach at correcting inaccuracies in densitometers involves integrating a speed-of-sound measurement of the process fluid with the natural frequency measurement of a vibrating tube density meter to form a system with an enhanced ability to operate accurately in aerated fluids. Introducing a real time, speed-of-sound measurement address the effects of aeration on multiple levels with the intent to enable vibrating-tube-based density measurement to continue to report liquid density in the presence of entrained air with accuracy approaching that for a non-aerated liquid. Firstly, by measuring the process sound speed with process pressure, the aeration level of the process fluid can be determined with high accuracy on a real time basis. Secondly, the real time measurements of sound speed, and the derived measurement of gas volume fraction, are then utilized with empirically derived correction factors to improve the interpretation of the measured natural frequency of the vibrating tubes in terms of the density of the aerated fluid. Thirdly, the combined knowledge of aerated mixture density and aerated mixture sound speed, enable the determination of the non-aerated liquid component density, providing improved compositional information. Note liquids phase typically includes pure liquids, mixtures of liquids, as well as liquid/solid mixtures.

For densitometers, such as a Corilois meter, a decrease in the accuracy of the measurments with the introduction of bubbly fluids is well documented. In fact, others have attempted to correct for the effect of entrained air by correlating observed errors in mass flow to the gas volume fraction within the process fluid. These authors proposed a correction based on GVF as follows:

$$R = \frac{2\alpha}{1-\alpha}$$

where α represents the gas volume fraction and R represents decrease in measured (apparent) mass flow normalized by the true mass flow. Thus, using this correlation, a 1% increase in entrained air would result in a roughly 2% underestimate of the actual mass flow. Although this formulation appears to capture the general trend observed experimentally, it has two drawbacks for use in the field. Firstly, the Coriolis meter typically has no direct way to measure the gas volume fraction. It has been suggested to use the measured apparent density of the fluid to estimate the level of entrained air, however, this is problematic since both of the two fundamental measurements, phase difference and natural frequency, are impacted by changes in the reduced frequency of the Coriolis vibration. Secondly, it is unlikely that the gas volume fraction is the only variable influencing the relationship between measured phase difference and mass flow and the measured natural frequency and density. Although gas volume fraction appears to correlate over at least some range of parameters, the physics of the problem suggest that sound speed, via a reduced frequency effect, may also have a direct influence on the data interpretation.

One method would be to use a direct sound measurement from the process fluid to aid in the interpretation of the Coriolis meter. In this interpretation, the reduced frequency parameters developed herein is included in interpreting the relation between the phase difference in the vibrating tubes and the mass flow as well as a direct role in interpreting the natural frequency of the oscillating flow tubes in terms of process fluid density. The sound speed measurement, combined with knowledge of process liquid and gas components as well as process temperature and pressure, enables a direct measurement of entrained air as well. Thus, the reduced frequency parameter and gas volume fraction can be used as inputs in the interpretation of phase lag in terms of mass flow. Due to the strong relationship between air content in liquids and mixture sound speed, the role of the reduced frequency parameter in the interpretation of the fundamental measurement of the Coriolis meter will have a more pronounce effect in bubbly flows. However, changes in sound speed and hence reduced frequency of operation in various types of liquids and other process mixtures have an effect on the interpretation and hence accuracy of Coriolis meter used in these applications as well. Consider, for example, the performance of a Coriolis meter on two liquids—water and oil. Assuming that the fluids have different densities and sound speeds, the different fluid properties suggest that the Coriolis meter will be operating at different reduced frequencies. The reduced frequency for the water will typically be ~10%-30% lower than that for the oil application. Recognizing that, while they are different, the reduced frequencies for both applications are still "small", the impact on accuracy may not be significant. However, some degree of inaccuracy is introduced by not accounting for the differences in the reduced frequency of operation of the Coriolis meter in this application. For other density meter, such as a nuclear densitometer, these meters may corrected simply knowing the gas volume fraction (or gas void fraction) of the fluid.

Figure 17:
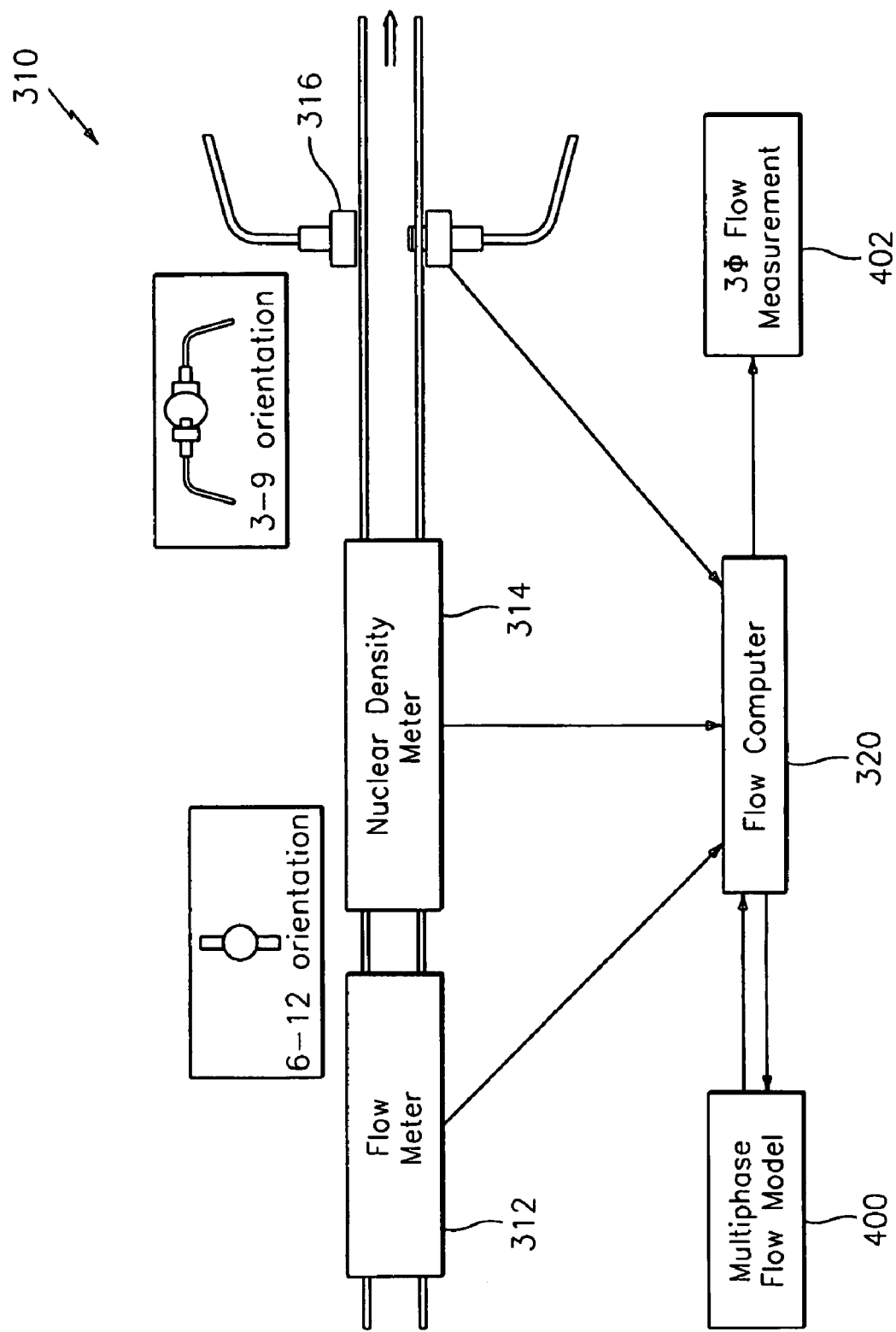
FIG. 17 is a clamp-on multi-phase (e.g. three phase) flow measurement apparatus comprising flow meter similar to that shown in FIG. 15 having an array of strain-based sensors, a clamp-on density meter such as a nuclear densitometer, and at least one ultrasonic sensor to provide a watercut measurement, in accordance with the present invention.

Referring to FIG. 17, a clamp-on three phase flow measurement apparatus 310 is shown that provides a phase fraction measurement of the fluid flow and a volumetric flow rate of each of the phases of the flow 102. The flow may be full or partially full (i.e., stratified). The clamp on apparatus 310 comprises a flow meter 312 having a plurality of strained-based sensors disposed longitudinally along the pipe 104 similar to that shown in FIG. 15. The flow meter 312 processes the data from the array of sensors similar to that described hereinbefore as indicated in the flow logic of the processing unit 108 of FIG. 15 and FIG. 12, to provide a fluid flow velocity. The clamp-on apparatus 310 further includes a clamp on density meter 314, such as a nuclear densitometer, wherein the sensors of the densitometer are positioned or oriented at approximately 6 and 12 o'clock or top and bottom of the pipe 104 to ensure the radiant beam pass through both gas and liquid of a stratified flow. The densitometer provides a density measurement, which is used to determine the gas volume fraction of the 3-phase fluid. The clamp-on apparatus 310 further includes at least one ultrasonic sensor 316 for determining the watercut of the liquid phase of the three phase fluid 102. The sensor 316 is disposed orthogonal to the sensors of the densitometer at 3 and 9 o'clock or in the horizontal position to ensure the ultrasonic beam or signal propagates primarily through the liquid of a stratified fluid flow. The data and/or sensed signals of the three clamped on devices 312, 314, 316 are provided to a flow computer 320 which processes the data using a multiphase flow model 400 to provide three phase flow measurements 402 of the fluid flow 102, such as compositional data (e.g., phase fraction of each phase of the fluid), velocity of each phase of the fluid 102, volumetric flow rate of each phase, and mass flow rate of each phase. It should be appreciated that the multiphase flow model 400 receives the flow data from each device 312, 314 and 316 and processes the flow data to optimize and correct for any errors, inaccuracies, and/or various flow conditions or regimes. This optimized output flow data is then output as three phase flow measurement data 402.

Referring again to FIG. 17, although the sensors of the densitometer 314 (and thus the beam direction) are shown as being disposed vertically in a six o'clock and twelve o'clock position relative to the flow 102, it should be appreciated that the sensors (and thus beam) of the densitometer 314 may be disposed in any orientation relative to the flow 102 suitable to the desired end purpose. For stratified flows, a gamma densitometer may be sensitive to stratification when the beam is traversing the fluid flow in the vertical direction. In effect the densitometer measures the height of an interface rather than the holdup or gas volume fraction. By rotating the densitometer a small amount, the sensitivity of the densitometer to the stratification or partially filled pipe is reduced. Rotating the beam off the vertical axis by approximately 26.5 degrees has shown an improvement in the measurement.

Figure 18:
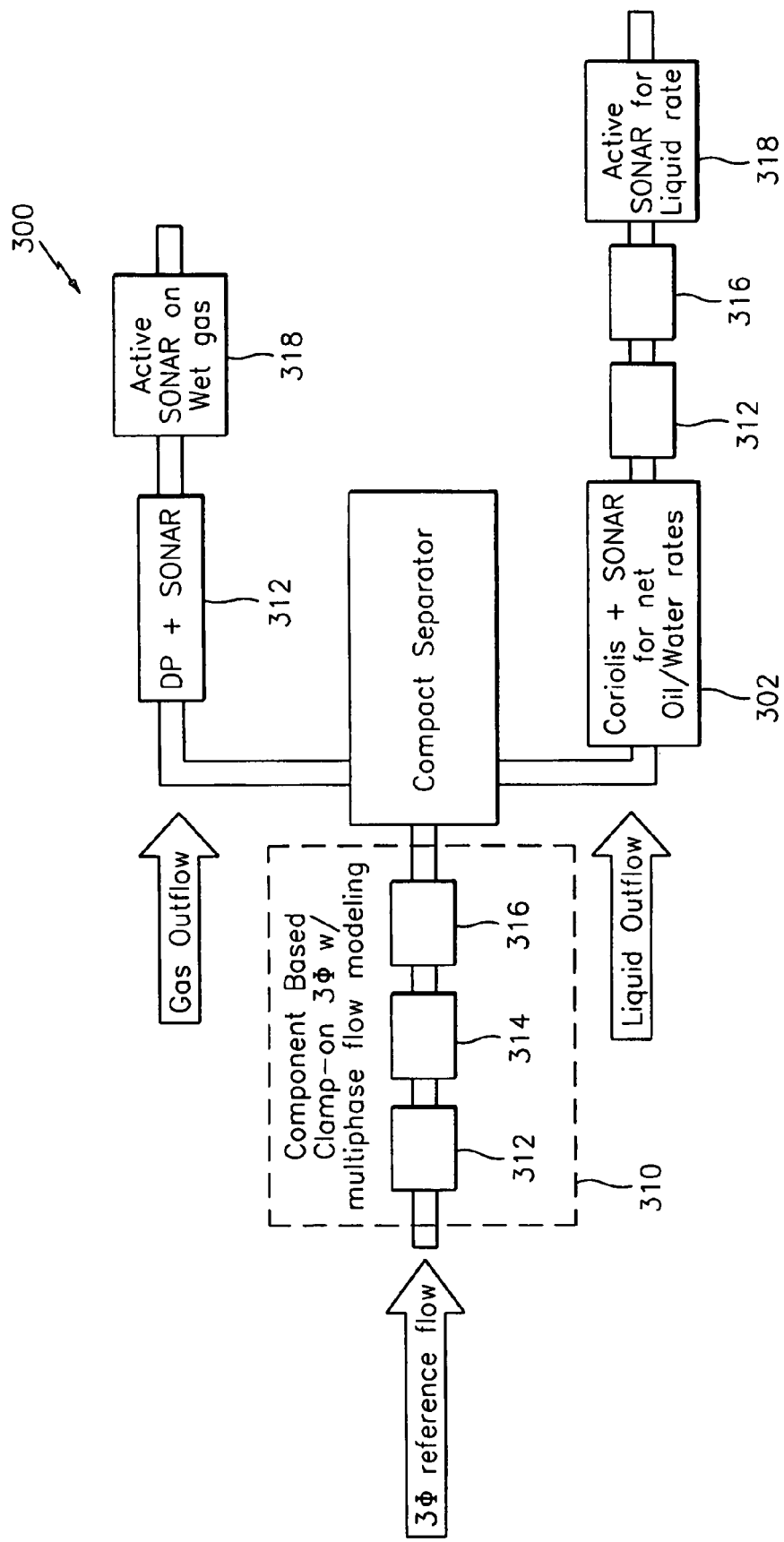
FIG. 18 is schematic diagram of a system for monitoring and measuring flow parameters of a fluid separator, wherein the three phase measurement device of FIG. 17 is provided on the input pipe of the separator, the flow measurement device of FIG. 16 is provided on the liquid leg of the separator, and the wet gas flow measurement device is provided on the gas leg of the separator.

FIG. 18 illustrates a schematic diagram of well surveillance system, wherein the input and output flows of a fluid separator is provided. Specifically, the clamp-on multiphase measurement apparatus 310 of FIG. 17 is used to measure the flow passing within the input pipe of the separator. The measurement apparatus of FIG. 16 is provided on the liquid leg of the separator for measuring the parameters of the aerated liquid mixture (e.g., aerated oil and water mixture). The gas leg of the separator includes a wet-gas flow measurement device similar to that described in U.S. Provisional Patent Application No. 60/724,952 filed Oct. 6, 2005; and U.S. Provisional Patent Application No. 60/697,479 filed Jul. 7, 2005, which are incorporated herein by reference. The embodiment provided in FIG. 18 further includes a flow meter 318 comprising an array of ultrasonic sensors similar to that shown and described in FIG. 1, FIG. 4 and FIG. 16. The flow meter 318 may be used in combination with the passive flow meter 312 and differential pressure (DP) meter, or simply in combination with the DP meter.

One will appreciate that while each of the apparatus includes devices in a particular order on the pipe, one will appreciate that the device may be disposed in any order.

The dimensions and/or geometries for any of the embodiments described herein are merely for illustrative purposes and, as such, any other dimensions and/or geometries may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. An apparatus for determining a characteristic of an aerated fluid flowing within a pipe, the device comprising:
   at least one first sensing device associated with the pipe to sense a low-frequency component and a high-frequency component of the aerated fluid flow, wherein said at least one first sensing device generates first sensor data responsive to said low-frequency component of the aerated fluid and second sensor data responsive to said high-frequency component of the aerated fluid flow;
   at least one second sensing device associated with the pipe to sense predetermined parameters of the aerated fluid flow and to generate third sensor data responsive to said predetermined parameters of the aerated fluid flow; and
   a processing device, wherein said processing device is communicated with said at least one first sensing device and said at least one second sensing device to receive and process said first sensor data, said second sensor data and said third sensor data to generate fluid data responsive to a characteristic of the aerated fluid flow.

2. The apparatus of claim 1, wherein said characteristic of the aerated fluid flow is at least one of a Gas Volume Fraction (GVF), a volumetric flow rate, a WaterCut value, a liquid flow rate and a net/oil/water rate.

3. The apparatus of claim 1, wherein said first sensor data is responsive to the speed of sound through the fluid flow.

4. The apparatus of claim 1, wherein said second sensor data is responsive to at least one of the primary flow measurement and the speed of sound through a liquid component of the fluid flow.

5. The apparatus of claim 1, wherein said at least one first sensing device includes a plurality of sensing devices, wherein said plurality of sensing devices are axially distributed along the pipe.

6. The apparatus of claim 1, wherein said at least one second sensing device includes a plurality of second sensing devices, wherein said plurality of second sensing devices are axially distributed along the pipe.

7. The apparatus of claim 1, wherein said at least one second sensing device includes at least one of a density meter and a mass flow meter.

8. The apparatus of claim 1, wherein said at least one first sensing device includes a transmitting device and a receiving device, wherein when said transmitting device and said receiving device are associated with the pipe, said transmitting device and said receiving device are disposed on opposing sides of the pipe.

9. The apparatus of claim 1, wherein the apparatus includes a fastening device for removably and securely associating the apparatus with the pipe, wherein the fastening device is configured for easy removal and installation.

10. The apparatus of claim 1, wherein the apparatus is securely associated with an external portion of the pipe via a clamp-on device.

11. An apparatus for determining a characteristic of a multiphase fluid flowing within a pipe, the device comprising:
    a flow sensing device associated with the pipe to sense a first parameter of the multiphase fluid, wherein said flow sensing device generates flow rate data responsive to the first parameter;
    a density sensing device associated with the pipe to sense a second parameter of the multiphase fluid, wherein said density sensing device generates density data responsive to the second parameter;
    a watercut sensing device associated with the pipe to sense a third parameter of the multiphase fluid, wherein said watercut sensing device generates watercut data responsive to the third parameter; and
    a processing device including multiphase flow model logic, wherein said processing device is configured to receive said flow rate data, said density data and said watercut data, and process said flow rate data, said density data and said watercut data responsive to generate optimized three phase flow measurement data responsive to said multiphase flow model logic.

12. The apparatus of claim 11, wherein the flow sensing device, the density sensing device and the watercut sensing device are secured to the outer surface of the pipe.

* * * * *